United States Patent
Chen et al.

(10) Patent No.: US 8,639,552 B1
(45) Date of Patent: Jan. 28, 2014

(54) SYSTEMS AND METHODS FOR CREATING AND SHARING TASKS

(71) Applicant: BroadVision, Inc., Redwood City, CA (US)

(72) Inventors: Pehong Chen, Atherton, CA (US); James Wu, Sunnyvale, CA (US); Dongfeng Lu, Leawood, KS (US); Peter Chu, Cupertino, CA (US)

(73) Assignee: BroadVision, Inc., Redwood City, CA (US)

( * ) Notice: Subject to any disclaimer, the term of this patent is extended or adjusted under 35 U.S.C. 154(b) by 0 days.

(21) Appl. No.: 13/758,831

(22) Filed: Feb. 4, 2013

Related U.S. Application Data

(60) Provisional application No. 61/756,398, filed on Jan. 24, 2013.

(51) Int. Cl.
*G06Q 10/00* (2012.01)

(52) U.S. Cl.
USPC .......................................................... 705/7.21

(58) Field of Classification Search
USPC .......................................................... 705/7.21
See application file for complete search history.

(56) References Cited

U.S. PATENT DOCUMENTS

| | | | | |
|---|---|---|---|---|
| 7,624,125 | B2 * | 11/2009 | Feinsmith ............................... | 1/1 |
| 8,027,861 | B2 * | 9/2011 | Brintle .......................... | 705/7.26 |
| 2011/0276396 | A1 * | 11/2011 | Rathod ....................... | 705/14.49 |
| 2011/0289149 | A1 * | 11/2011 | Shmueli et al. ................ | 709/205 |
| 2012/0278388 | A1 * | 11/2012 | Kleinbart et al. .............. | 709/204 |

OTHER PUBLICATIONS

Asana.com; "World Wide Web site Asana.com," http://www.asana.com/; last visited on Apr. 24, 2013, in two pages.
Do.com; "World Wide Web site Do.com," https://www.do.com/; last visited on Apr. 24, 2013, in three pages.
Producteev.com; "World Wide Web site Producteev.com," http://www.producteev.com/; last visited on Apr. 24, 2013, in two pages.

* cited by examiner

*Primary Examiner* — Mark A Fleischer
(74) *Attorney, Agent, or Firm* — Knobbe Martens Olson & Bear LLP

(57) ABSTRACT

Systems and methods for creating and sharing tasks over one or more networks are disclosed. In one embodiment, a system comprises a message retrieval module configured to retrieve electronic messages and parse them into a plurality of tasks. The system can also include a task creation module configured to process the message to identify task information and one or more task recipients. The task creation module can also be configured to create a task based on the identified task information. A task notification module can be configured to notify the one or more task recipients about the created task. The system may also include a multi-layer network management module configured to organize the tasks and task participants into multiple networks and clouds and into a federation of clouds. The system can also include a task analytics module programmed to analyze the tasks performed by users of the system.

30 Claims, 19 Drawing Sheets

SYSTEMS AND METHODS FOR CREATING AND SHARING TASKS

CROSS-REFERENCE TO RELATED APPLICATIONS

This application claims the benefit of U.S. Provisional Patent Application No. 61/756,398, filed Jan. 24, 2013, entitled "SYSTEMS AND METHODS FOR CREATING AND SHARING TASKS," which is hereby incorporated by reference herein in its entirety and for all purposes.

BACKGROUND

1. Field of the Invention

The present invention relates to systems and methods for creating and sharing tasks across one or more networks.

2. Description of the Related Art

Global communications networks have enabled users to collaborate on projects, whether the collaborating users are located near one another or are separated by thousands of miles. Users can collaborate over one or more networks using real-time communications tools (e.g., voice communications and online real-time messaging) or using time-delay communications tools (e.g., e-mail). When collaborating on projects, there may be various tasks that need to be accomplished according to a particular timeline. Further, it may be desirable to assign different tasks to different users that are connected over the one or more networks. Because the users may be physically or temporally separated from one another, it can be difficult to efficiently manage the various tasks that are required for a project.

Furthermore, some projects and tasks may be performed by users within a company or organization. In other circumstances, however, it may be desirable for a task to be performed by users that may be members of different companies or organizations, or that may be unaffiliated with any particular company or organization.

However, for tasks that include multiple users and assignments, it can be difficult to create and manage the tasks over one or more communications networks. Conventional electronic mail (e-mail) systems can be used to communicate with multiple users. However, e-mail alone may not adequately create a virtual environment where users are accountable for accomplishing their assigned tasks according to the desired task schedule. Sending an e-mail to a group of users does not of itself indicate that the recipient(s) agree to, or are able to, perform the assigned task(s) according to the desired timeline.

Furthermore, in e-mail systems, it can be difficult to share content data and manage task assignments in real-time. For example, when one user updates a spreadsheet with new data, the other users cannot readily see the updates unless the user re-sends the spreadsheet to all the users. When multiple documents are being created and edited by multiple users, the back-and-forth nature of e-mail can create confusion, as users may be unsure which version of a document is the most updated or which assignments are being performed by which users. In addition, the back-and-forth nature of e-mail can create confusion as to whether and when assignments have been accomplished and may not adequately ensure that the task assignments are being completed according to the desired schedule.

SUMMARY

The systems, methods and devices of the present disclosure each have several innovative aspects, no single one of which is solely responsible for the desirable attributes disclosed herein.

In one embodiment, a method in a server for sharing content over one or more networks with a plurality of users is disclosed. The method can comprise receiving a message from a task creator. Further, the method can include processing the message to identify task information and one or more task recipients. In addition, a task can be created based on the identified task information. The one or more task recipients can be notified about the created task.

In another embodiment, a system for sharing content over one or more networks is disclosed. The system can include a message retrieval module programmed to receive a message from a task creator. The system can further include a task creation module programmed to process the message to identify task information and one or more task recipients. The task creation module can also be programmed to create a task based on the identified task information. The system can include a task notification module programmed to notify the one or more task recipients about the created task.

In yet another embodiment, a non-transitory computer-readable medium is disclosed. The non-transitory computer-readable medium can have stored thereon code that when executed performs a method comprising receiving a message from a task creator. The method can include processing the message to identify task information and one or more task recipients. Further, the method can comprise creating a task based on the identified task information. The one or more task recipients can be notified about the created task.

In one embodiment, a system programmed to support one or more networked networks is disclosed. The system can comprise a task management module programmed to organize a plurality of tasks and a plurality of task participants associated with the plurality of tasks. The system can further include a multi-layered network management module programmed to organize the plurality of tasks into a plurality of networks based at least in part on a network identifier associated with each task. The multi-layered network management module can be programmed to organize the plurality of networks into a plurality of clouds based at least in part on affiliations among the plurality of networks. The multi-layered network management module can be programmed to organize the plurality of clouds into a federation of clouds based at least in part on interactions among the plurality of clouds.

In another embodiment, a method for organizing one or more networks is disclosed. The method can comprise sorting a plurality of tasks and a plurality of task participants associated with the plurality of tasks. Further, the plurality of tasks can be organized into a plurality of networks based at least in part on a network identifier associated with each task. The plurality of networks can be organized into a plurality of clouds based at least in part on affiliations among the plurality of networks. The plurality of clouds can be organized into a cloud federation based at least in part on interactions among the plurality of clouds.

In one embodiment, a computer-implemented method for analyzing task data associated with a plurality of tasks and a plurality of task participants is disclosed. The method can include identifying the plurality of task participants. The method can also comprise associating the plurality of task participants with the plurality of tasks. Task data associated with the tasks and the task participants can be aggregated. The aggregated task data can be analyzed.

In another embodiment, a system for analyzing task data associated with a plurality of tasks and a plurality of task participants is disclosed. The system can comprise a task analytics module programmed to identify the plurality of task participants. The task analytics module can be programmed to associate the plurality of task participants with the plurality of tasks. Further, the task analytics module can be programmed to aggregate task data associated with the tasks and the task participants. The task analytics module can be programmed to analyze the aggregated task data.

In one embodiment, a computer-implemented method for managing computer objects stored on a system of one or more networks is disclosed. The method can comprise providing a graphical user interface that lists a plurality of computer objects, wherein each object comprises content. Further, the method can include associating each computer object with one or more authorized users. A status can be assigned to each computer object that indicates the status of that computer object within the system. The assigned status can be indicated on the graphical user interface to each of the authorized users associated with the computer object.

In another embodiment, a system for managing a plurality of computer objects stored on one or more networks is disclosed. The system can comprise an object management module programmed to associate each computer object with one or more authorized users, each computer object comprising content. The object management module can be programmed to assign a status to each computer object that indicates the status of that computer object within the system. The system can also comprise an integrated interface module programmed to provide a graphical user interface that lists the plurality of computer objects. The integrated interface module can be programmed to indicate the assigned status on the graphical user interface to each of the authorized users associated with the computer object.

In one embodiment, a computer-implemented method for managing tasks is disclosed. The method can comprise identifying a new task to be shared by a plurality of users in a computer memory. One or more users can be invited to share the new task. The method can further include receiving an acceptance of the new task from the one or more users. The one or more users that accepted the new task can be associated with private task information. A status can be assigned to the new task based on the stage of completion of the new task by the one or more associated users. The method can include organizing the new task and a plurality of other tasks into a network of tasks based at least in part on a network identifier associated with the new task.

In another embodiment, system having one or more processors and configured for managing tasks is disclosed. The system can comprise a task management module configured to run on the one or more processors and programmed to identify a new task to be shared by a plurality of users. The task management module can also be programmed to invite one or more users to share the new task. Further, the task management module can be programmed to receive an acceptance of the new task from the one or more users. The task management module can be programmed to associate the one or more users that accepted the new task with private task information. In addition, the task management module can be programmed to assign a status to the new task based on the stage of completion of the new task by the one or more associated users. The system can further include a multi-layered network management module configured to run on the one or more processors and programmed to organize the new task and a plurality of other tasks into a network of tasks based at least in part on a network identifier associated with the new task.

In yet another embodiment, a non-transitory computer-readable medium is disclosed. The computer-readable medium can have stored thereon code that when executed by a processor performs a method. The method can comprise identifying a new task to be shared by a plurality of users. The method performed by the processor can also include inviting one or more users to share the new task. Further, the method can include receiving an acceptance of the new task from the one or more users. The one or more users that accepted the new task can be associated with private task information. The method can also include assigning a status to the new task based on the stage of completion of the new task by the one or more associated users. The new task and a plurality of other tasks can be organized into a network of tasks based at least in part on a network identifier associated with the new task.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Specific embodiments of the invention will now be described with reference to the following drawings, which are provided by way of example, and not limitation.

DETAILED DESCRIPTION

Figure 1:
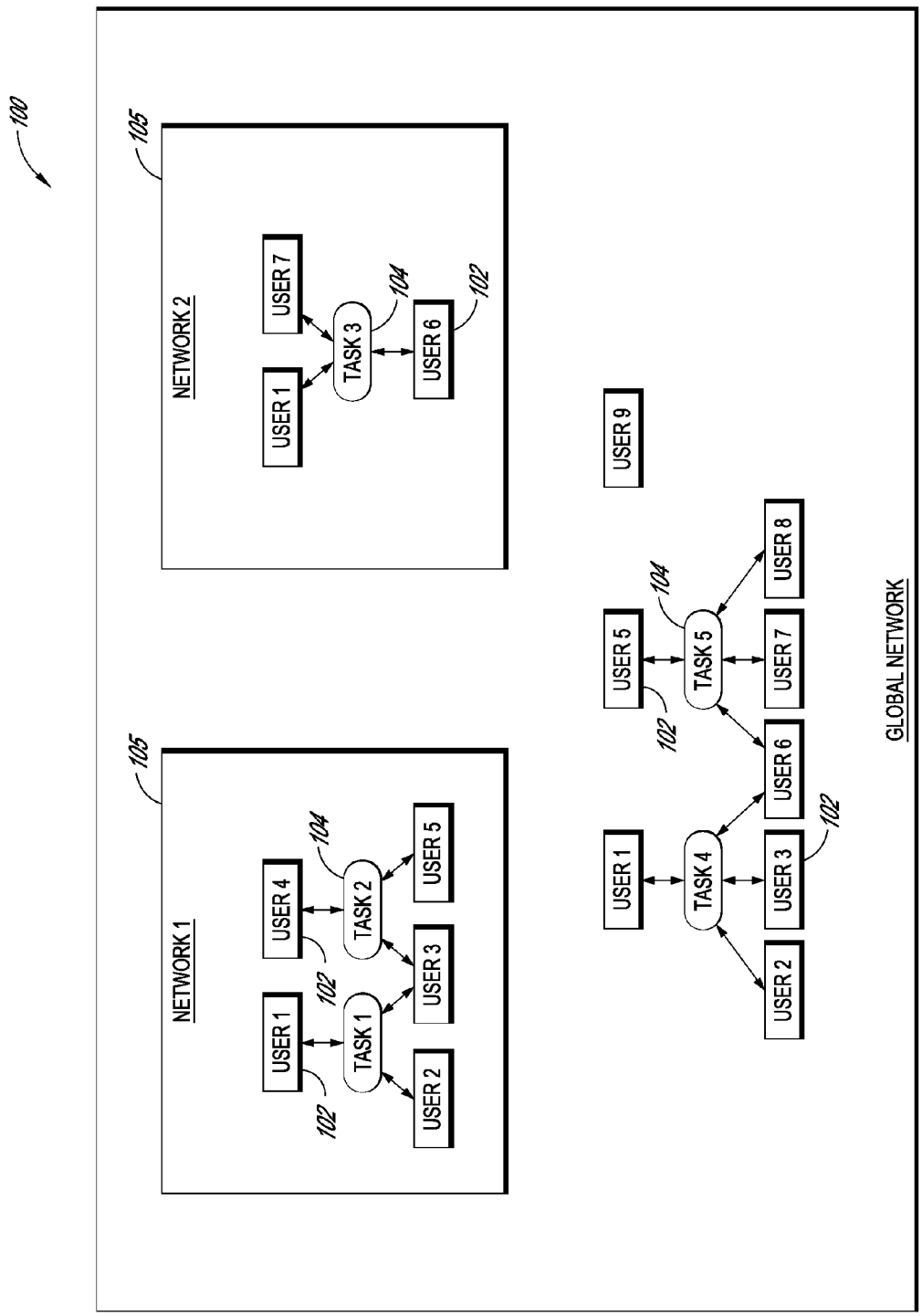
FIG. 1 is a schematic block diagram of multiple tasks shared over an global network including multiple individual networks, in accordance with one embodiment.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

Embodiments of the invention relate to systems and methods for sharing content and managing tasks within and between networks. For example, a company or organization may set up one or more communications networks to connect its employees to one another. The employees of the company or organization may participate in various projects, and each project can include one or more tasks. When a project needs to be completed, embodiments of the invention can automatically setup and schedule multiple tasks between users. These tasks can be assigned to multiple employees to complete over a predetermined timeline or schedule. As described herein, the tasks can be created and assigned over the one or more communications networks, and task content data can be shared among the employees across the network(s). Tasks can be very short term tasks, such as completing a letter, or longer term tasks, such as completing a series of laboratory experiments or designing a new product. Any type of scheduled event managed by one or more parties can be used within embodiments of the system to track and manage their progress towards task completion. In addition to managing tasks to be performed by task participants, the system can also manage and organize documents associated with the tasks and task participants. The system can employ a user interface to share documents among task participants and can ensure that task participants are accountable for tasks that they are assigned to complete.

For example, a user Bob may wish to schedule a task to be completed by Alice and Mary. Using embodiments of the invention, Bob would send an e-mail message with a specific subject line to Alice and Mary asking them to perform the task. In the email message, Bob would copy a specific email address of a task management system. The task management system would receive the email from Bob and first identify that Alice and Mary are all part of the same task group as Bob, based on header information in the email message, such as user e-mail addresses. In addition, the task management system would review the subject line and parse the text of the email message to determine the subject, or type of task to be created. In an alternate embodiment, the system may look for keywords or a specific formatting of text or fields within the e-mail message to determine the type of task, name of task, and due date for completion.

Once the task management system has identified the parties and the task to be completed, a record is created in the task management system corresponding to the new task. This record would include information regarding the task, its timeline for completion, and the parties that are involved in working on the task. In one embodiment, the system tracks the subject line of the message and the sending party, and if other messages from the same party, with the same subject line, are sent, they can also be posted to the same newly created task. This allows the system to move messages from the originator, and also other individuals in the email, into a chat page within the task management system.

After the record has been created, the task management system, in one embodiment, may send out a link to a webpage that manages that task and any communication between the parties regarding the task. For example, the task management system may create an electronic chat room specific to the task so that the parties can review and post messages regarding the task that do not need to circulate through email. The webpage may also display a calendar of due dates or milestones for the project, and also allow authorized individuals associated with the task to modify task parameters or add/remove individuals from the task. By removing the task from being managed by email communication between all the parties, the parties can efficiently communicate and manage completion of their task in a far more efficient manner.

It should also be realized that the task management system is not limited to only communicating to parties through a web interface or electronic chat room, and that certain parties could indicate within the system that they prefer to be notified of new task messages or changes by way of email, text or other mode of communication.

Moreover, in certain embodiments, users within a company or organization may wish to share content and/or collaborate on tasks with users outside of the company or organization. And thus, there is no limitation on Bob, Alice and Mary being part of the same organization. The task management system can be configured to setup new tasks for multiple users across one to many organizations without departing from the spirit of the invention.

In one embodiment, the system is configured to store party preferences and can thus, for example, predefine deadlines for certain parties. Thus, any email from Bob that starts a new task can automatically be scheduled to be completed within two days. In addition, the task management system can be configured to store and monitor activities of the parties and set task schedules based on past preferences and settings by a party. Thus, by knowing that Bob always sets two day deadlines for his tasks, the system can monitor and review that information and automatically being to default all of Bob's tasks to have two day deadlines.

In addition, embodiments of the system include a robust status monitoring and user management system for monitoring and reporting on the status of tasks that are being performed by the parties. For example, a manager can review status reports indicating all those employees under his management and determine which employee is completing their tasks on time, which employees are completing their tasks within several days of the deadline, and which employees are habitually late in completing assignments. Because the task management system stores data relating to start time the task was initiated, the scheduled due date, and the progress made towards completion by each party to the task, the system can generate management reports that are very useful in managing the work requirements for each employee. Further, in various embodiments, the task management system can assist managers in monitoring the productivity of employees. For example, the system can monitor the efficiency of each employee, e.g., the time it takes each employee to complete a task. Further, the system may monitor the productivity based on feedback given by other task participants.

In addition, because the task management system tracks external tasks, such as from customers, vendors and collaborators, the system is configured to track which outside individuals are most closely working with the company. For example, an engineering company may work with dozens of outside vendors, but not have an easy mechanism for rating how well each vendor is providing service. By placing the vendor's projects within the task management system, the company can then track and report on which vendors are providing timely service and which vendors are late or do not complete service as expected. In addition, the system can also monitor and report on the length of time each vendor is taking to complete particular projects and their associated cost. Further, the task management system may monitor the quality of each vendor's services or products based on feedback given by other task participants or by third parties. By monitoring this information in the task management system, the company can gain insight on which vendor is actually providing high quality, timely service, at the agreed-upon price. In various other embodiments, the task management system can monitor the customers of a company, such as by monitoring how frequently each customer interacts with the company or participants in a task with employees of the company. For example, customers that interact frequently with the company may be prioritized by the company, because the company may desire to focus their efforts and resources on current, fresh customers and contacts, rather than older, stale customers and contacts.

In various embodiments, the task management system can facilitate task collaborations in a multi-layered network environment. For example, in a first layer, the system can enable collaboration on tasks within a particular user group or department of a company, such as the company's engineering group. In various embodiments, a company or organization can be a user group. In a second layer, the system can enable collaboration across user groups or departments within the company. In a third layer, the system can facilitate communications and collaborations among users in different companies or organizations. The system may also regulate communications and collaborations between different groups of companies, such as groups of companies within various geographic or political divisions. For example, access controls can be established to facilitate task collaborations between users associated with organizations in different countries.

In yet other embodiments, the task management system can include a task analytics module or system that enables users to spawn networks within their own companies or organizations and that enables organizations to analyze relationships associated with tasks performed by members of the organization. Indeed, because the task management system can monitor the e-mail and/or network IDs of the users that utilize the system, the task management system can sort the system users and task participants according to organizations and/or companies with which they are affiliated. As users of new organizations or companies are invited to participate in tasks with current users, the task management system can enable the newly added or invited users to create, or spawn, their own networks within their company or organization. For example, one embodiment is a people-relationship map that is generated to allow managers of a company to view the relationships of people in their organization with others. In this embodiment, the system tracks ongoing projects between different individuals within, and outside of, a company and can map those relationships. This allows the system to create graphs and maps of relationships that can be used to determine who is currently working with particular individuals, the scope of work being performed, and who is completing and performing their tasks in a timely manner.

For example, if Rose, a current system user affiliated with Company X, collaborates with Sue, a non-user of the task management system affiliated with Company Y, on a particular task, then Sue may become a new user of the task management system. As the authorized users of Company Y are added to the global network, Sue's contacts and collaborators can leverage the members of Company Y in any tasks in which they collaborate with Sue or any other employees of Company Y. Thus, if Company X and Company Y are collaborating on a new product design, an engineering team member of Company X can utilize the expertise of the marketing team of Company Y to improve sales of the new design. By providing multiple layers of networks that connect users across different organizations and companies, the task management system can advantageously leverage the expertise of users across multiple organizations and companies.

Indeed, the embodiments disclosed herein enable users to spawn their own networks and create their own intra-organization and/or inter-organization relationships. As explained herein, new users may be invited into the disclosed task management system, for example, by e-mail, and may participate in many types of tasks in the system. Once a new user joins the task management system, the user may create or join their own company or intra-organization network that provides a platform and security for task or object management within the organization. In some arrangements, the user-created network can also include an association of companies. By upgrading a new user's individual network to a company- (or association of companies) or organization-wide network, new networks and relationships can be created between different companies or organizations, as explained herein with respect to FIGS. 1 and 8A-8B, for example. As with real world relationships between companies and between individuals in different companies, the disclosed systems can thereby automatically create new networks and connections between companies and individuals by automatically recognizing common users or contacts.

In various embodiments, a task analytics dashboard, or user interface, can be presented to company- or organization-level executives or managers. The dashboard can include various pages that illustrate user productivity and user relationships, as well as project data and topic data. The dashboard can analyze task data that is aggregated by the task management system and can be presented to a decision-maker to assist in making decisions. For example, in some embodiments, the dashboard can help decision-makers with internal personnel or task assignment decisions. In addition, the dashboard can help decision-makers with high-level decisions regarding competitors, business partners, the future direction of a particular product line, etc.

Furthermore, in various embodiments, each user (e.g., task participant) can be presented with a user inbox-outbox interface. The user inbox-outbox interface can list multiple objects that are associated with the user. For example, as used herein, an object may refer to a task, a message, a document, etc. The objects can be stored on one or more servers accessible by various authorized users. The stored objects can be modified by the authorized users such that a persistent copy of the objects can always be available to each authorized user. Furthermore, the stored objects may be presented in a centralized interface accessible by the authorized users, such as on a webpage.

For example, a document stored on one or more servers may be created by User 1, edited by User 2, and edited again by User 1 (or another user). The document may be presented as a single object to each authorized user so that only one version of the object (e.g., the document in this example) is viewed and manipulated by the authorized users. Similarly, a message from User 2 to User 1 can be presented in the inbox of User 1 and the outbox of User 2. If User 1 replies to User 2 or forwards the original message to User 3, the message object may nevertheless appear as a persistent object in the User 1's, User 2's, and User 3's respective inbox-outbox interfaces. Users 1, 2, and 3 can therefore transmit and receive multiple messages using the same persistent object in a convenient and intuitive interface.

In addition, tasks may be presented in a user's inbox-outbox interface. For example, Task 1 that is created by User 1 and assigned to User 2 may appear in User 1's outbox and in User 2's inbox. The inbox-outbox interface can present the schedule for completing the task, such as the timeline for completing each step of the task. Further, the inbox-outbox interface can display the status of the task. For example, the interface can indicate whether the task is assigned, pending, or completed. Other status types may also be possible. An assigned task may be a task that has been assigned by the task creator to the task recipient(s), but that has not yet been accepted by the task recipient(s) and/or not yet begun by the task recipient(s). A pending task may be a task that has been accepted by the task recipient(s) but that is currently being performed by the task participants. A completed task may be a task that has been fully performed by the task participants. The inbox-outbox interface may also sort the tasks by status, such that tasks that are to be performed by the user are presented before tasks that are to be performed by another user. Further, the inbox-outbox interface may sort the tasks by due date, such that tasks that are due sooner are presented before tasks that are due later.

As with documents and messages, the tasks stored on the server(s) and presented in the inbox-outbox interface may be updated by the authorized users (e.g., task participants). Authorized users may be notified when the objects are updated. For example, when one user has begun a task, the user may update the task status to "pending." Similarly, when a user completes a task, the user can update the task status to "completed." These updated task statuses may be presented to other authorized users on their respective inbox-outbox interfaces. Furthermore, the inbox-outbox interface can indicate the date and/or time that various actions have been taken and by whom. The inbox-outbox interface can therefore act as a common interface that holds all authorized users or task participants accountable for their assigned responsibilities and ensures that the task timelines are followed. Thus, the inbox-outbox interface may also serve as a persistent interface for storing and editing tasks, in addition to documents and messages. Moreover, the inbox-outbox provides a centralized real-time platform for knowing the status of all ongoing tasks by the authorized users.

Communications platforms, such as the Clearvale systems developed by BroadVision, Inc., of Redwood City, Calif., may be used to implement some or all of the embodiments disclosed herein. Various details of the Clearvale system have been described in U.S. Patent Publication No. US 2011/0282944, filed May 12, 2011, and published on Nov. 17, 2011, which is hereby incorporated by reference herein in its entirety and for all purposes. In various embodiments, the embodiments described herein may be implemented over the Internet.

DEFINITIONS

As used herein, an input device can be, for example, a keyboard, rollerball, mouse, voice recognition system or other device capable of transmitting information from a user to a computer. The input device can also be a touch screen associated with the display, in which case the user responds to prompts on the display by touching the screen. The user may enter textual information through the input device such as the keyboard or the touch-screen.

Embodiments of the invention are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A Local Area Network (LAN) or Wide Area Network (WAN) may be a corporate computing network, including access to the Internet, to which computers and computing devices comprising the system are connected. In one embodiment, the LAN conforms to the Transmission Control Protocol/Internet Protocol (TCP/IP) industry standard.

As used herein, media refers to images, sounds, video or any other multimedia type data that is entered into the system.

A microprocessor may be any conventional general purpose single- or multi-chip microprocessor such as a Pentium® processor, Itanium® processor or an ALPHA® processor. In addition, the microprocessor may be any conventional special purpose microprocessor such as a digital signal processor (DSP) or a graphics processor.

The system is comprised of various modules as discussed in detail below. As can be appreciated by one of ordinary skill in the art, each of the modules comprises various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as LINUX, UNIX or MICROSOFT WINDOWS®.

The system may be written in any conventional programming language such as C, C++, BASIC, Pascal, Perl, or Java, and run under a conventional operating system.

A web browser comprising a web browser user interface may be used to display information (such as textual and graphical information) to a user. The web browser may comprise any type of visual display capable of displaying information received via a network. Examples of web browsers include Microsoft's Internet Explorer browser, Apple's Safari Browser, Mozilla's Firefox browser, Google's Chrome browser or any other browsing or other application software capable of communicating with a network. Further, information may also be configured for and displayed in other suitable applications, such as applications programmed for implementation in mobile devices, such as mobile phones or other mobile computing devices.

The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

System Overview

FIG. 1 is a schematic block diagram of multiple tasks 104 shared over an global network 100 including multiple individual networks 105, in accordance with one embodiment. The global network 100 can include one or more networks 105 that are interconnected by way of any suitable communications protocol. The global network 100 can include a multitude of users 102 that are able to communicate with each other over the one or more individual networks 105. Furthermore, each network 105 can include one or more communities, which can be different divisions within an organization. The communities can represent, for example, various groups within a company or organization, such as an engineering group, a human resource group, a marketing group, or a sales group. Each user can belong to one or more of the communities.

Each network 105 can be, for example, a company intranet or support Website hosted on one or more servers. The users 102 can be members of the network 105, and can interact with the network 105 using a user interface (UI) through a device such as a computer, tablet, personal digital assistant (PDA) and/or mobile phone. Each user can be prompted for a password before logging into the network 105 in some embodiments. In other arrangements, however, each network 105 can be accessed over the World Wide Web. The global network 100 can include all associated users 102. Each user 102 of the global network 100 may belong to one or more individual networks 105, or may only belong to the global network 100 and not to any particular individual network 105. If a user 102 is a member of a particular individual network 105, the user 102 can log in to the network 105, create a task 104 in the network 105, and assign the task 104 to network users 102. Alternatively, a user 102 may create tasks 104 in the global network 100 and assign the task 104 to the user's contacts. A particular task 104 may be created in and may belong to a particular network 105. As explained herein, a network identifier, or network ID, can associate a task 104 with a particular network 105, or with the global network 100.

In the global network 100 of FIG. 1, the networks 105 can include Network 1 and Network 2 that are connected to each other by various communications media and platforms, such as the Clearvale platform and/or the World Wide Web. For example, User 1, User 2, User 3, User 4, and User 5 can be members or users 102 of Network 1, and can participate in one or more tasks with each other in Network 1. Users 1-5 may be employees of or otherwise associated with the same company or organization, and can be connected across Network 1. User 1, User 6, and User 7 can be members or users of Network 2. As with Network 1, Users 1, 6, and 7 may be employees of or otherwise associated with the same company or organization, or they may simply elect to belong to Network 2. For example, as shown in FIG. 1, User 1 may belong to both Network 1 and Network 2, in addition to being a member of the global network 100. Users 8 and 9 may be unaffiliated with a particular individual network 105, yet Users 8 and 9 may still participate in tasks as members of the global network 100. However, in the example of FIG. 1, User 9 is a user 102 of the global network 100, but User 9 is not currently participating in, or has not participated in, any tasks with other users of the global network 100. While only two networks 105 and nine users 102 are illustrated in FIG. 1, it should be appreciated that any number of networks and users may be suitable.

Each of the users 102 of the global network 100 shown in FIG. 1 may participate in one or more tasks within and/or across the networks 105 of the illustrated global network 100. For purposes of illustration, the users 102 of Network 1 (e.g., Users 1-5) may be employees of a product design company, Company A, or they may be associated with employees of Company A. The users 102 of Network 2 (e.g., Users 1, 6, and 7) may be employees of a printing firm, Company B, that develops and prints advertising materials, or they may be associated with employees of Company B. For example, Users 6 and 7 may be employees of Company B, while User 1 may be an employee of Company A that has collaborated with an employee of Company B. Thus, User 1 may belong to both Network 1 and Network 2. User 8 may be an owner of a banquet facility that rents space for various purposes, and User 9 may be an independent contractor that is a member of the global network 100. It should be appreciated that these examples are for purposes of illustration only. Skilled artisans will appreciate that various other combinations of users and/or organizations are possible according to the embodiments disclosed herein.

The multiple users 102 may collaborate with each other on a variety of tasks 104. As shown in FIG. 1, users 102 within a particular network 105 may collaborate on tasks 104 only with other users 102 of that network 105 in some cases. However, in other cases, one or more users 102 within a network 105 may collaborate on tasks 104 with users 102 that are within the same network 105 and/or within another network 105. In addition, each task 104 may be associated with a particular network 105 or with the global network 100, based on, e.g., a network ID related to the network in which the task 104 was created. For example, User 1, User 2, and User 3 may collaborate on Task 1. As shown, Task 1 may be associated with and may be performed by users entirely within Network 1. Continuing with the example introduced above, Task 1 may include, for example, the design of a widget that will be incorporated in a product to be released soon. In this example, Users 1, 2, and 3 may be members of Company A's engineering team.

The illustrated Task 2 may also be associated with Network 1. For example, Task 2 may be assigned to User 3, User 4, and User 5, all of whom are within Network 1, e.g., associated with Company A, whether by being employees of Company A or by being associated with colleagues that are employees of Company A. As an example, User 4 and User 5 may be members of Company A's marketing department. User 4 and User 5 may collaborate with User 3 on Task 2 to integrate the final product design into Company A's marketing materials. Turning to Task 3, User 1, User 6, and User 7 may collaborate on Task 3 entirely within Network 2, e.g., only with users 102 that are employees of Company B, the printing company, or that are associated with employees of Company B. In this example, User 6 and User 7 may be employees of Company B, while User 1 (an employee of Company A) may have collaborated on various projects in the past with User 7. For example, Users 1, 6, and 7 may collaborate on Task 3 to print technical specification booklets of the new product to be delivered for Company A's product release banquet. As with Tasks 1 and 2, Task 3 may be performed by users 102 that are located entirely within their respective networks, e.g., by users within the same company or organization, or users that are associated with other users that are members of the same company or organization.

Task 4 illustrates a task 104 that may be performed by users 102 that are located within different networks 105, e.g., by users 102 located within Networks 1 and 2. For example, User 1, User 2, and User 3 from Network 1 may collaborate with User 6 from Network 2 on Task 4 to organize various details of Company A's product release banquet, e.g., collaborating on high-quality product display boards to be set up for the banquet. Because the users collaborating on Task 4 are not necessarily members of the same individual network 105, Task 104 may be performed within the global network 100.

Similarly, Task 5 is a task 104 that may be performed by users 102 across multiple networks 105, e.g., by users 102 located within Network 1 (User 5), Network 2 (Users 6 and 7), and users unaffiliated with a particular individual network 105 (User 8, the banquet facility owner). For example, User 5 from Network 1 may collaborate with Users 6 and 7 from Network 2 and unaffiliated User 8 from the global network 100 on Task 5 to organize the delivery and set up of the marketing and promotional materials in the banquet facilities owned by User 8. Thus, as shown in the global network 100 of FIG. 1, multiple users 102 can collaborate across multiple networks 105 to perform multiple tasks 104. Task 5 may be associated with one or all of Network 1, Network 2, and the global network 100. In some arrangements, Task 5 may be associated with the network in which the task creator created the task 104.

Figure 2A:
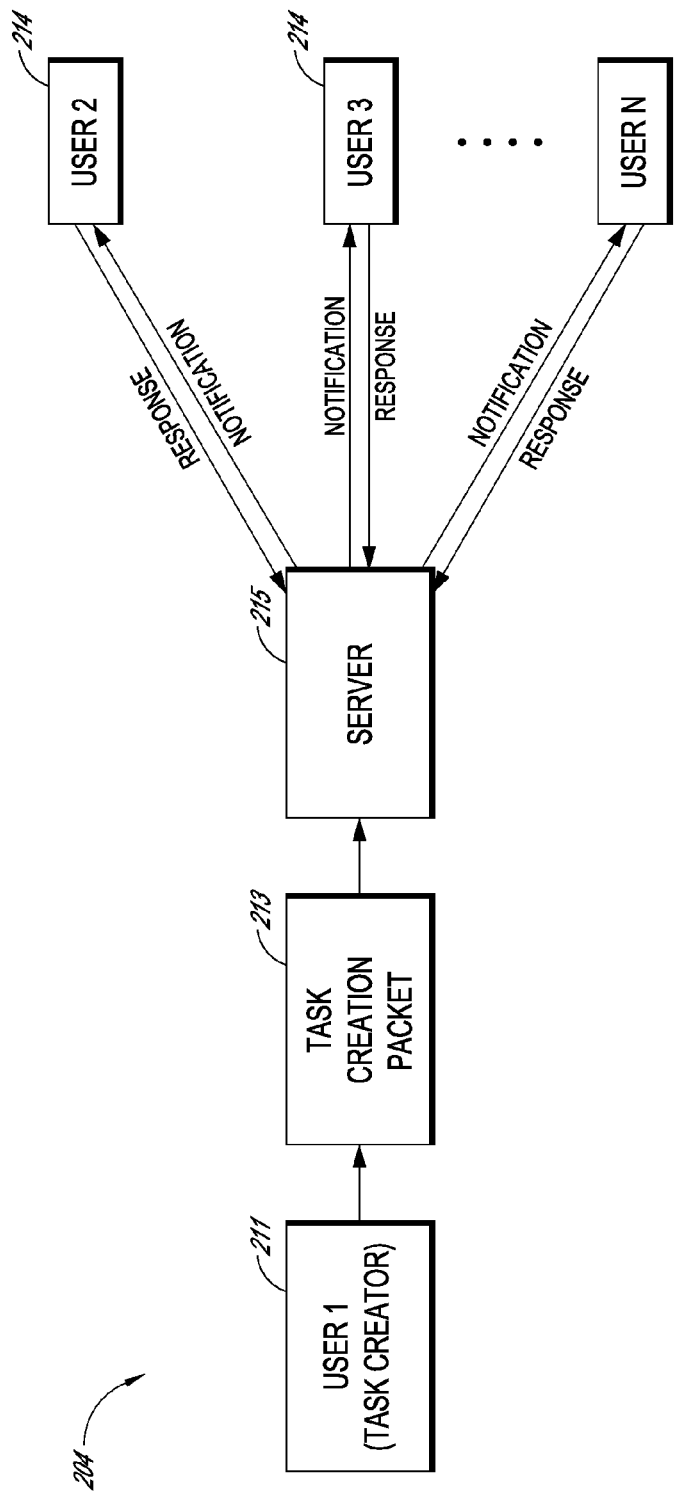
FIG. 2A is a schematic block diagram illustrating the creation of a task shared over one or more networks, in accordance with one embodiment.

One embodiment of a system for managing tasks is shown in FIG. 2A, which is a schematic block diagram illustrating the creation of a task 204 shared over one or more networks. The task 204 may be initiated by a task creator 211. The task creator 211 can be any suitable user 102 within the global network 100, as explained above with reference to FIG. 1. In some cases, for example, the task creator 211 may be a project manager, such as the group leader of the team developing the widget for Company A's final product design. To create the task 204, the task creator 211 can generate a task creation packet 213 that is configured to create the task 204. The task creator 211 can assign various assignments related to the task 204 to one or more task recipients 214. The task creation packet 213 may be sent to a server 215, which in turn can notify N task recipients 214 associated with the task 204 that the task creator 211 has assigned them to the task 204. The N task recipients 214, illustrated as Users 2 through N in FIG. 2A, can then send a response to the server 215 indicating whether or not they will accept their assignment to the task 204. The server 215 can similarly transmit the confirmation of the assignment to the task creator 211.

As used herein, the task creator 211 can be a user that initiates the task 204, and the task recipient(s) 214 can be user(s) that are assigned to, or requested to be assigned to, the task 204. Both the task creator 211 and the task recipient(s) 214 can be task participants, because they all may participate in the completion of the task 204. In some cases, however, a task recipient 214 may decline to participate in the task 204 and may therefore not be considered a task participant.

Figure 2B:
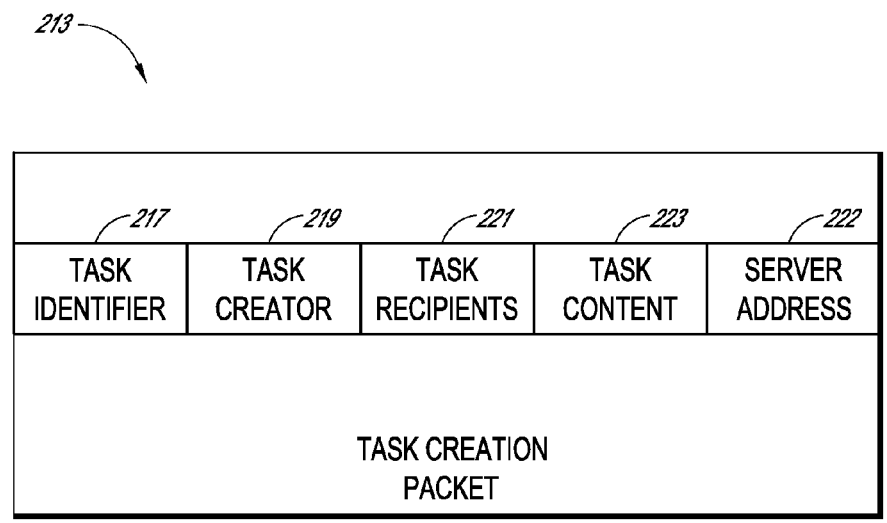
FIG. 2B is a schematic block diagram of a task creation packet, in accordance with one embodiment.

FIG. 2B is a schematic block diagram of an exemplary task creation packet 213, in accordance with one embodiment. The task creation packet 213 can include a task identifier 217 that uniquely identifies the task 204. Because the server 215 may process multiple tasks from multiple users, it can be important to ensure that the tasks 204 are accurately sorted such that each task 204 received by the server 215 is accurately assigned to the correct users and that each task 204 includes the correct information for the task 204. The task creation packet 213 can also include a task creator entry 219 that identifies the task creator 211. For example, the task creator entry 219 can include the name and/or the username of the task creator 211. In some aspects, the task creator entry 219 can include a network or e-mail address of the task creator 211.

The task creation packet 213 can also include a task recipients entry 221 that includes information that identifies one or more recipients 214 of the task. For example, the task recipients entry 221 can include the name and/or username of the task recipients 214. The task recipients entry 221 can also include a network or e-mail address of the task recipients 214. While multiple task recipients 214 are shown in FIG. 2A, it should be appreciated that there may be only one task recipient 214.

The task creation packet 213 can also include task content data 223. The task content data 223 can include details of the task 204, such as the overall goals and objectives of the task 204. The task content data 223 can also include a listing of the task assignments that are assigned to each user associated with the task 204. Further, the task content data 223 can include a task schedule that manages the progression of the task 204. The task content data 223 can also include various accountability measures, such as a schedule of reminder notification that can be sent to the task participants to remind them of their assignments.

The task creation packet 213 can also include a server address field 222. The server address field 222 can include a network ID of the server 215. The network ID may be used at run time to identify whether the user logs in to a specific network 105 or to the global network 100 (FIG. 1). In some arrangements, the server 215 can be assigned an e-mail address to which the task creator 211 may send the task creation packet 213. In such instances, the server address field 222 may also include the server's e-mail address.

The task creation packet 213 can be implemented in any suitable format. In one embodiment explained herein, the task creation packet 213 can be implemented in an e-mail message. However, in other embodiments, the task creation packet 213 can be implemented in other formats or using other structures. For example, the task creation packet 213 can be implemented in a website. In other arrangements, the task creation packet 213 can be implemented in a text message (e.g., an SMS message), a voice communication, or a video communication. In such arrangements, the task creator 211 initiates the task 204 by composing an SMS message, a voice communication, or a video communication that outlines the details of the task, the task assignments, and/or the task schedule.

Figure 2C:
FIG. 2C is a schematic block diagram of a task creation packet implemented in an electronic mail (e-mail) message, in accordance with one embodiment.

FIG. 2C is a schematic block diagram of an e-mail task creation packet 220, in which the task creation packet 213 of FIG. 2B is implemented in an e-mail message. Using e-mail to implement the task creation packet 213 can be particularly advantageous, in part because e-mail is so ubiquitous. Many or most users have an e-mail address and are comfortable using e-mail. If tasks are instead managed over closed systems, e.g., systems that require special access authorities to participate, then users may be disinclined to use the closed system or it may be difficult for users to learn the closed system. By implementing the task creation packet 213 in an e-mail task creation packet 220, tasks can be efficiently and effectively created and managed by most users without creating additional obstacles to use.

The e-mail task creation packet 220 of FIG. 2C can include the task identifier 217, the task creator entry 219, the task recipients entry 221, and task content data 223 as described above with respect to FIG. 2B. In particular, the task identifier 217 can be implemented in a subject line field of an e-mail message. For example, the task creator 211 can write an e-mail message that includes a subject line specific to the task 204 at hand. For instance, continuing the example of the product design company above, the task creator 211 can create an e-mail message with the subject line reading "Create Widget Prototype." In some arrangements, the text within the subject line can be used as the unique task identifier 217. In other arrangements, however, the server 215 can assign a numeric or alphanumeric identifier associated with the text of the subject line. In some cases, for example, the server 215 can generate additional text to be appended to the subject line of the e-mail that ensures that the task 204 is associated with the correct participants and content data. While the identifier field 217 is shown as corresponding to the "Subject" line of the e-mail message, in other embodiments, the task identifier field 217 can be located with the message field of the e-mail message.

The task creator entry 219 can correspond to the "From" field of the e-mail message. Thus, the task creator 211 can initiate the task 204 by opening a new e-mail message using the task creator's 211 own e-mail account. In the example of FIG. 2A, the task creator 211 is User 1, and the task creator entry 219 reflects that User 1 is the task creator 211. The task recipient's entry 221 can correspond to one or both of "To" and "Carbon Copy," or "CC," fields of the e-mail message. In the example of FIG. 2C, the task recipients 214 can be listed in the e-mail message such that User 2 is listed on the "To" field and Users 3 and 4 are listed on the "CC" field of the e-mail message. When the task creator 211, e.g., User 1, sends the e-mail message that initiates the task 204, Users 2 and 3 will all receive the message. Although the "To" and "CC" fields are illustrated, it should be appreciated that the "Backchannel" or "BCC" field may also be used to send the message to the task recipients 214.

The task content data 223 can correspond to data within the e-mail message field. For example, task objectives and task schedules can be listed in text or image data within the message field of the e-mail. As shown in the example of FIG. 2C, the e-mail message field can include a short note from the task creator 211 that indicates that the assigned task 204 includes scheduling a design meeting, dividing tasks among the participants, and creating a schedule for the finished design. The task recipients 214 may thereby be notified of the general outlines of the task 204 assigned to them. In addition, the server address field 222 can be either the "To" or "CC" fields. As shown in FIG. 2C, the server address field 222 lists "tasks@server.com." When the task creator 211 sends the task creation e-mail, the task creator 211 may list "tasks@server.com," or other e-mail address assigned to the server, in the "To" and/or the "CC" lines of the e-mail. Thus, the server 215 will also receive the e-mail task creation packet 220, which can assist in creating and managing the task 204 on the server 215. As above, the task recipients' email addresses can also be listed in the "BCC" field of the e-mail message.

Thus, the task creation packet 213, which can correspond to an e-mail task creation packet 220, can be sent by e-mail from the task creator 211 to the task recipients 214 and to the server 215. The packet 220 can include task identifying information as well as task content data which can be viewed by the task participants. As explained below in more detail, the server 215 can receive and process the task creation packet 213, and can perform various other task management functions. For example, the server 215 can coordinate scheduling and accountability for performance of the tasks 204 and can also process and analyze data about the users, e.g., the task participants.

Figure 3:
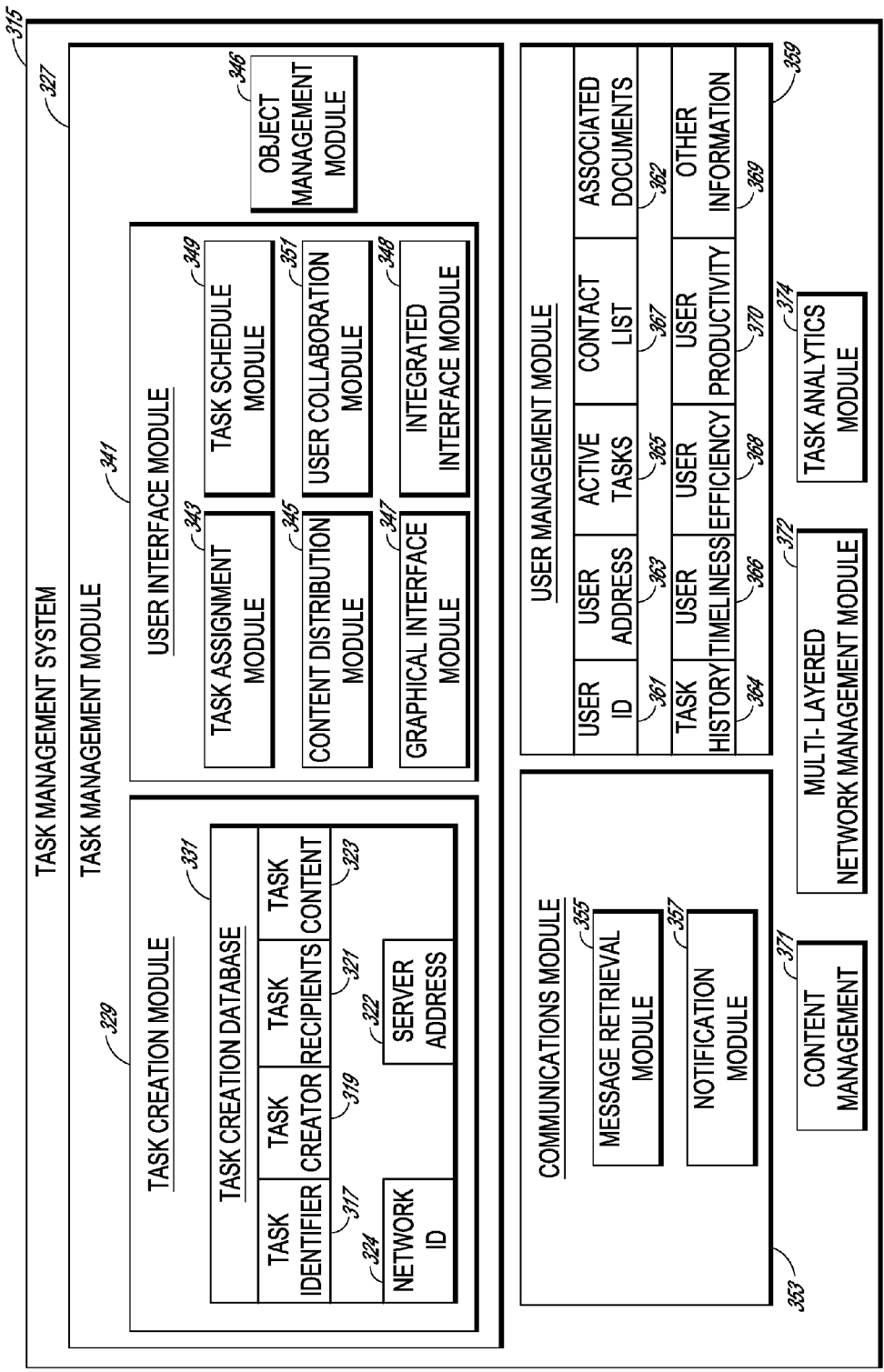
FIG. 3 is a schematic block diagram of a task management system, in accordance with one embodiment.

FIG. 3 is a schematic block diagram of a task management system 315, in accordance with one embodiment. The task management system 315 can include multiple modules that can be implemented and/or stored on a server, such as the server 215 described above. The task management system 315 can include a task management module 327, which can include a task creation module 329, an object management module 346, and a user interface module 341. The task creation module 329 can include a task creation database 331 that processes and stores the task creation packets 213 received from the task creators 211. The task creation database 331 can therefore include data structures that store data received for a plurality of tasks. For example, the task creation database 331 can store an array of the task identifiers 317, task creator entries 319, task recipients entries 321, task content data 323, server addresses 322 that identify the addresses of the servers hosting the tasks, and network IDs 324 that identify to which network a user logs in. For example, a user can create a task within a particular network, e.g., Network 1, and the task may thereby be associated with Network 1 by way of the network ID 324. Thus, for each task creation packet 213 that is received by the server 215, the task management system 315 can process and store the information contained in the packet 213 in the task creation database 331. In order to process the information received in the packets 213, the task creation module 329 can further include instructions for identifying and sorting the information in the packets 213.

The object management module 346 can be configured to manage computer objects shared over one or more networks. Examples of such objects include tasks, documents, messages, etc. For example, in some embodiments, the object management module can include instructions to associate each computer object with one or more authorized users and to assign a status to each computer object that indicates the status of that computer object within the system. In various embodiments, the object management module 346 can include instructions to receive a plurality of objects that include object content associated with the object, associate objects with one or more authorized users, assign an object status to each object, process update data for the objects, and update the objects according to the processed update data. As explained herein with reference to FIGS. 12 and 13, the object management module 346 can also include instructions that provide a central sharing platform for authorized users to monitor the status of objects and to impart accountability upon the authorized users. Further, the object management module 346 can provide a platform for sharing persistent objects with authorized users. For example, when one user modifies a document or replies to a message, the updated object (e.g., the modified document or replied-to message) may automatically present itself to authorized users so that the users have a persistent object with which to work. Similarly, when there are updates to an outstanding task, the object management module 346 can include instructions that update the task objects to reflect the work done and to identify the user that performed the work on the task. Additional details with respect to the object management module 346 are presented herein with respect to FIGS. 12 and 13.

The user interface module 341 can include various modules for processing, sorting, and displaying task information. In some implementations, for example, the task information, e.g., information about the task and task assignments, can be shared among the task participants using the user interface module 341. The user interface module 341 can include a task assignment module 343. The task assignment module 343 can be configured to assign portions or divisions of the task to one or more task participants associated with the task. For example, referring back to the examples of FIG. 2A, User 1 may be the task creator 211, and may assign various tasks to Users 2 and 3, such as, e.g., assigning responsibility for completing various portions of the widget in the final product design. The task creator, or User 1, may also be assigned with a portion of the task.

The user interface module 341 can also include a task scheduling module 349. The task scheduling module 349 can be configured to provide a schedule for performance of the task. For example, the task scheduling module 349 can store information about the overall timeline for completion of the task. Further, the task scheduling module 349 can be configured to notify task participants with reminders about due dates for completing their assigned portions of the tasks. The task scheduling module 349 can also request confirmation of receipt of instructions for participants' assigned portions of the task. By reminding participants about their task obligations, the task scheduling module 349 can thereby increase accountability for participating users and can improve the coordination among task participants.

In addition, the user interface module 341 can include a content distribution module 345. The content distribution module 345 can be configured to share various types of content. For example, the content distribution module 345 can be configured to share a document (such as a text or word processing document), a digital video, a blog entry, or a forum post with one or more tasks participants associated with the task. Task participants can work on common documents, such as common word processing documents, presentation files, or spreadsheets. The task participants can edit the documents and can save the updates to the task management system 315. By providing a central content distribution module 345, documents can be easily edited such that confusion regarding version control and user assignments is minimized.

The user interface module 341 can also include a user collaboration module 351. The user collaboration module 351 can be configured to facilitate communication among the one or more task participants associated with the task. For example, in some arrangements, the user collaboration module 351 can include instant electronic messaging systems to allow task participants to communicate with one another in real-time. In other arrangements, the user collaboration module 351 can include real-time video and/or voice communications modules to enable participants to visually and/or verbally communicate with one another. The task management system 315 can thereby provide a central workspace and task management center that enables multiple task participates to effectively perform their assigned task elements.

The user interface module 341 can comprise a graphical interface module 347 configured to render task information for display on a user device. For example, the various modules of the user interface module 341 can be presented on a website hosted on the World Wide Web. Users can interact with the task management system 315 using various input devices to post content on the task management system 315, including documents, messages to other task participants, and any other data that can be used in the performance of a task. As explained herein with respect to FIGS. 10A-10D, the user interface module 341 can also be programmed to present a task analytics dashboard to a decision-maker, such as a company manager or executive.

Figure 12:
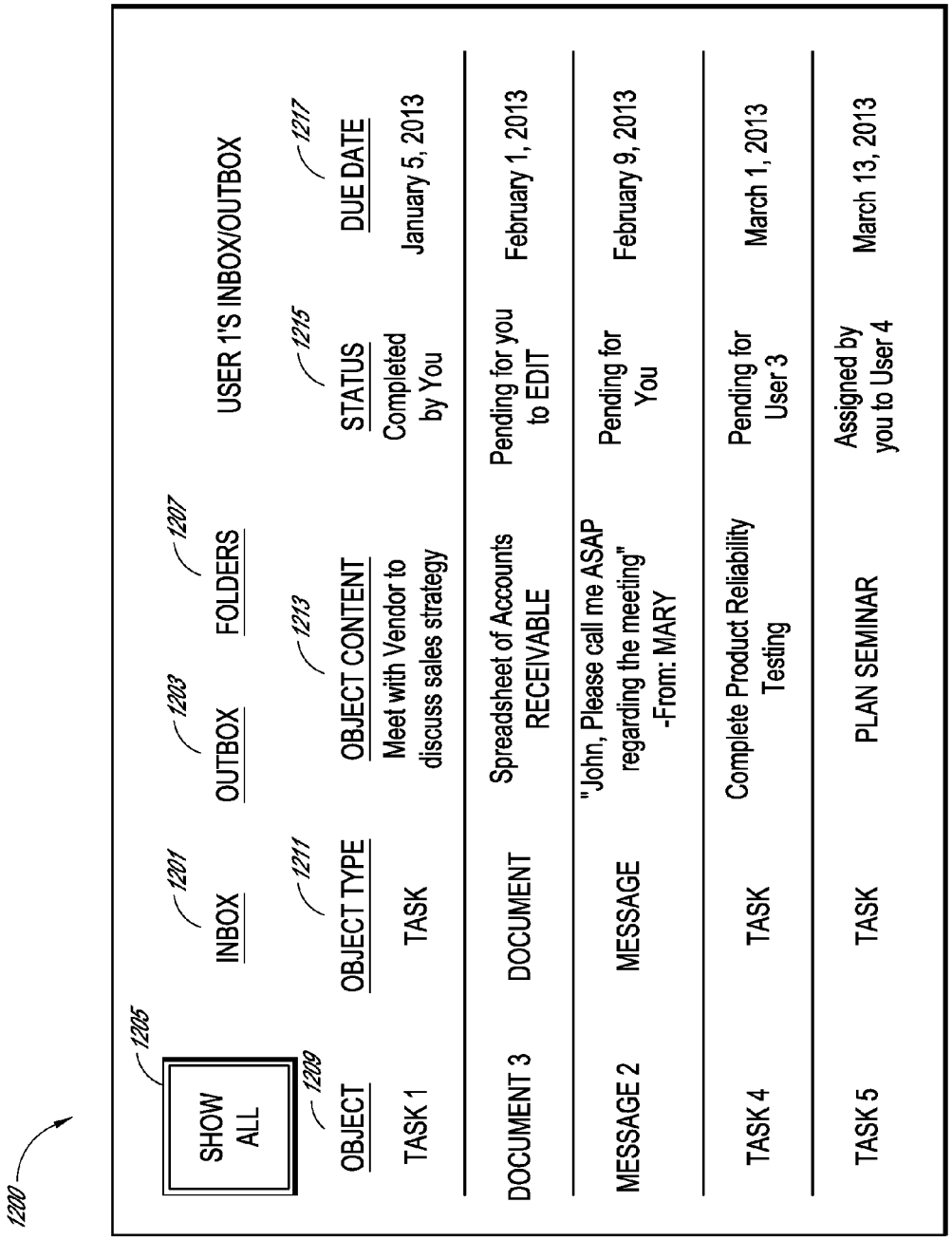
FIG. 12 is a schematic diagram of a user's inbox-outbox interface, in accordance with various embodiments.

Furthermore, the user interface module 341 can include an integrated interface module 348 that may be programmed to incorporate the functionalities of the other modules of the user interface module 341 and that can be programmed to implement a user inbox-outbox interface, such as an interface implemented on a webpage. For example, the integrated interface module 348 may include instructions to provide a graphical user interface that lists the plurality of computer objects and to indicate the assigned status on the graphical user interface to each of the authorized users associated with the computer object. As described herein with reference to FIGS. 12 and 13, for example, the user inbox-outbox interface can provide an integrated interface to authorized users that presents objects to users in real-time and that includes status updates and due dates for objects. The integrated interface module 348 can therefore be configured to share objects and updates to those objects with other authorized users. For example, the integrated interface module 348 can present various data fields organized and/or managed by the object management module 346. As shown in FIG. 12, for example, the integrated interface module 348 may render the inbox-outbox interface for presentation to a user.

The task management system 315 can further comprise a communications module 353 configured to provide communication among the task participants. The communications module 353 can comprise a message retrieval module 355 that is configured to receive a message from the task creator. As explained above with respect to FIGS. 2A-2C, the message retrieval module 355 can be configured to receive the message from the task creator in an e-mail message. Further, the message retrieval module 355 can be configured to parse each received message to identify task information (such as task content data) in the message by processing data in one or both of a subject field and a message field of the e-mail message. The message retrieval module 355 can also be configured to identify the task creator and one or more task recipients. For example, the message retrieval module 355 can identify the task creator by processing data in a "From" field of an e-mail message. The message retrieval module 355 can identify task recipients by processing data in one or both of a "To" field and a "CC" field of the e-mail message.

The communications module 353 can also comprise a notification module 357 configured to notify the task participants, e.g., the task creator and/or the task recipients, that the task has been created. The notification module 357 can further be configured to send reminder notices and confirmation notices to the task participants. In various embodiments, the notification module 357 can send such notices to the participants using e-mail.

The task management system 315 can also comprise a user management module 359 configured to process a plurality of tasks (and task initiation messages). The user management module 359 can identify task participant information for the plurality of tasks and can sort the task participant information according to desired sorting criteria. In general, the user management module 359 can gather and sort information about the users that participate in tasks processed by the task management system 315. The user management module 359 can analyze information about the users associated with the tasks in order to identify the users that are most active and/or most valuable to the owner and/or operator of the task management system 315.

For example, in some arrangements, the user management module 359 can analyze task participant information for each task participant or user to determine the number of tasks associated with the task participant or user. Further, the user management module 359 can analyze task participant information for each task participant or user to determine the frequency with which each user or participant interacts with the task management system 315 or participates in a task. By analyzing the number and frequency of interactions with the task management system 315, the user management module 359 can identify the most valuable users associated with the task management system 315. Operators and/or owners of the server can thereby use the information processed by the user management module 359 to identify the most valuable and/or current users of the server. The server operators and/or owners can in turn tailor advertisements, promotions, or other opportunities to the users that are most valuable to the operator and/or owner. As just one example, if User 1 has participated in ten tasks over the past month, while User 2 has participated in only two tasks over the past year, the server operator and/or owner may conclude that User 1 is a more valuable user. The server operator and/or owner may therefore prefer to send User 1 opportunities that arise, because User 1 has demonstrated an active, continuing, fresh commitment to participating in tasks on the server.

In various embodiments, the user management module 359 can monitor the users or participants in the system to determine how effective the users are in meeting task deadlines and expectations. For example, the user management module 359 may monitor the number and/or percentage of tasks in which each user meets or beats the listed deadline, e.g., due date, for a task. The user management module 359 may also monitor the productivity of each user or task participant. For example, the user management module 359 can measure the efficiency of each user, e.g., how long it takes the user to complete a task. In further arrangements, the user management module 359 can measure the productivity of a user based on feedback given by other task participants. For example, if User 1 is viewed as being a team player or an exceptionally talented contributor by User 1's collaborators, then the user management module 359 may determine that User 1 is a valuable user. The user management module 359 can accordingly sort and organize users according to task efficiency and productivity, and can prioritize users (e.g., employees, vendors, customers, etc.), according to their efficiency, quality of work, and/or productivity.

In various embodiments, the user management module 359 can monitor the number of tasks created by or assigned to a particular user. For example, the user management module 359 can track the users that have assigned tasks to a particular task participant and the dates and task identifiers or names that are associated with those assigned tasks. Similarly, user management module 359 can track the users, tasks, and dates of users that have been assigned tasks created by a particular task participant or user. In addition, the user management module 359 may track the number of tasks assigned or created over time, and can monitor whether those tasks are open tasks (e.g., ongoing), closed tasks (e.g., finished), or declined tasks (e.g., the task recipient elected not to participate in the assigned task). In some aspects, the user management module 359 may track the percentage or number of tasks completed over time to track the overall level of progress on one or more tasks or on a project. The user management module 359 can also track the average time to completion for a task or a project. As explained herein with respect to the task analytics module 374, task tracking may also be performed at a company- or organization-wide manner, in which case the total number of tasks or projects may be monitored to determine the number or percentage of tasks that are complete and an average time to complete the tasks or projects.

In addition, the user management module 359 may organize the processed tasks and task participants into one or more user groups. For example, the user management module 359 can recognize when groups of users, e.g., task participants, are affiliated with one another, such as by being employees of the same company or members of the same organization. In various arrangements, the user management module 359 can recognize affiliated users by processing their e-mail addresses. For instance, if two users share the same e-mail domain (e.g., their e-mail addresses are both listed as "@company.com"), then the user management module 359 may organize the two users into the same user group. The user management module 359 can thereby recognize and sort users based on their affiliations with a company or organization.

The user management module 359 may also associate documents, media and other data files with processed tasks and system users. For example, as explained herein, users may work on shared word processing, spreadsheet, presentation, text, or other types of documents or data files when collaborating on a task. The documents may be received from the users and stored on the task management system 315. The user management module 359 may associate the stored documents and media (e.g., video, audio, etc.) with the task participants and the tasks. For example, the user management module 359 can associate a word processing document containing an action item list, a spreadsheet listing cash flow projections, and engineering drawings with a project (e.g., group of tasks) related to a new product design and roll-out. The user management module 359 may also associate the documents or media with the task participants associated with the documents and can display the documents or media on a user interface using the user interface module 341. The task management system 315 may thereby effectively associate the plurality of tasks with the plurality of task participants and any documents or media associated with the task.

Moreover, when one or more tasks are directed to related subject matter, the user management module 359 may group the tasks into a task group. For example, if Cindy works on a task related to testing the reliability of a Widget, then the user management module 359 can store the task information that associates Cindy with the task that relates to the Widget test. If Dan subsequently works on a task relating to testing the same or a similar Widget, even on an unrelated task or project, then the user management module 359 may recognize that Dan's task is related to Cindy's task. For example, the user management module 359 may recognize similar keywords between Dan's and Cindy's tasks, or the user management module 359 may recognize that the subject matter is similar by way of, e.g., subject matter tags. In such arrangements, the user management module 359 may create task groups that include tasks that are directed to related subject matter. Indeed, the user management module 359 may also store tasks in a task history field so that future users may learn from and exploit the experiences of users who have collaborated on similar or related tasks.

In yet other arrangements, tasks may be grouped into one or more projects. A project may be, for example, a complex or long-term endeavor that includes multiple tasks that may or may not be directed to related subject matter. For example, if a project's objective is to roll out a new product design, then a company may assign disparate tasks to its multiple divisions. Executives may assign product development to the engineering department, product sales to its sales or marketing department, and product manufacturing to its manufacturing arm or to a third-party contractor. The user management module 359 can recognize that each task in a project, although potentially relating to different subject matter, is related to achieving the overall objectives of the project.

Further, the user management module 359 can monitor projects to determine the degree of completion of the projects by, e.g., monitoring the status of the task(s) that make up the projects. If, for example, a project includes five tasks, and if two tasks are completed while three remain uncompleted, then the user management module 359 may determine that the project is about 40% complete. In further arrangements, the user management module 359 can determine the overall degree of completion of the project by accounting for even partially completed tasks. For example, if there are five tasks in the projects, and if two tasks are each 25% completed and the other three tasks are each 50% completed, then the overall project status may be computed. In this example, therefore, the overall project completion may be determined by a linear combination of the partially completed tasks. For example, the two tasks (out of five total) that are only 25% completed yield a project completion status of $(2/5)*25\%=10\%$. The other three tasks that are each 50% completed contribute to a completion status of (3/5)*50%=30%. Thus, the total degree of completion of the project will be about 10%+30%, for a total degree of completion of about 40%. In sum, the user management module 359 can estimate the degree of completion of a project that includes one or more tasks.

In addition, each task participant or user can be associated with multiple other users over the course of participating in numerous tasks with the other users. Thus, each user can have or be associated with a contact list. The contact list can include a list of one or more contacts that have participated in at least one task with the task participant. Thus, each user and/or task participant can form a network of related contacts that have participated in task(s) on the task management system 315. For example, the task management system 315 can sort the contact list based at least in part on the frequency with which the contact(s) have participated in tasks with the task participant. Fresh and valuable relationships can therefore be prioritized. In some instances, for example, weights can be assigned to contacts on each user's contact list based on the value of each contact on the contact list. For instance, contact weights can be assigned to contacts based on the frequency with which the contact(s) have participated in tasks with the task participant. Thus, a first contact may be assigned a first contact weight, and a second contact may be assigned a second contact weight. If the first contact has more frequent and/or more recent interaction with the task management system 315 and participation in tasks than the second contact, then the first contact weight may be assigned a greater value than the second contact weight. The task management system 315 can thereby prioritize user contacts on the contact list based on the value of the user contacts and the underlying value of the contacts.

By monitoring tasks, task due dates, task participants, and interactions among task participants, the user management module 359 can provide valuable information to a company or organization. For example, the user management module 359 can inform executives and/or decision-makers about upcoming due dates or milestones of projects and/or tasks. By providing a company-wide schedule, the user management system 359 can give companies a high-level picture of the work that is being performed by its employees. The company can use these metrics to prioritize tasks or to make new investments. By monitoring user productivity, efficiency, and responsibility, companies can recognize valuable employees, vendors, and customers, and can prioritize its relationships accordingly. Further, by organizing documents associated with the tasks and task participants, the company or organization can easily and efficiently access the content associated with the tasks and/or projects at issue.

As shown in FIG. 3, the user management module 359 can include a database with a plurality of fields that can store information about the users and/or task participants. For instance, the user management module 359 can include a database with a user ID field 361 that includes the name and/or username of each user that has participated in a task over the task management system 315. Further, the database can have a user address field 363 that lists an e-mail or network ID of the user. An active tasks field 365 can include a list of all the tasks in which the user is currently participating. A contact list field 367 can store the contact list associated with each user. As explained above, the contact list can include a list of all users with which the user has participated in a task. Further, an associated documents field 362 can list documents that are associated with the user and/or the tasks associated with the user. Similarly, a task history field 364 can store the subject matter and/or keywords associated with tasks on which the user has collaborated in the past. Other users or organizations can exploit the task history field 364 to leverage users' prior experiences with a particular task or project. For example, a search engine can be provided to search for keywords and/or subject matter of prior tasks and/or task participants. A user timeliness field 366 and a user efficiency field 368 can be provided to monitor whether or not a user timely meets expected due dates and how fast a user completes various tasks. The company or organization can thereby compare users' efficiencies and reliability when making decisions. A user productivity field 370 may also be included to measure how productive a user is at a series of tasks or projects. For example, user productivity may be measured based upon feedback and/or surveys completed by other task participants, or even by third parties. A miscellaneous, other information field 369 can store additional information or notes about each user. For example, if the owner and/or operator of the server has additional information or a history with a particular user, then the owner and/or operator of the server can input this information into the other information field 369.

Thus, by gathering and sorting information about users that have participated in tasks on the server, the owner and/or operator of the server can utilize user information to optimize system performance or to otherwise benefit the owner and/or operator of the server. For example, relationships with active and/or valuable contacts can be prioritized over relationships with stale or otherwise inactive or less valuable contacts. The task management system 315 can also include a multi-layered network management module 372. As explained in more detail below, the multi-layered network management module 372 may advantageously manage the interrelationships among multiple individual networks and global networks. Further, as explained herein with respect to FIGS. 8A-8B and 9, the task management system 315 can include a task analytics module 374 configured to analyze the relationships between multiple task participants, projects, and task documents.

The task management system 315 can also include content management 371 that can store data associated with the functions performed by the task management system 315. For example, the content management 371 can include memory configured to permanently store instructions encoded as software that is configured to perform the functions on the task management system 315, as described herein. Further the content management 371 can store data received and processed by the task management system 315, including, e.g., task content information and user information.

Task Management Process Overview

Figure 4:
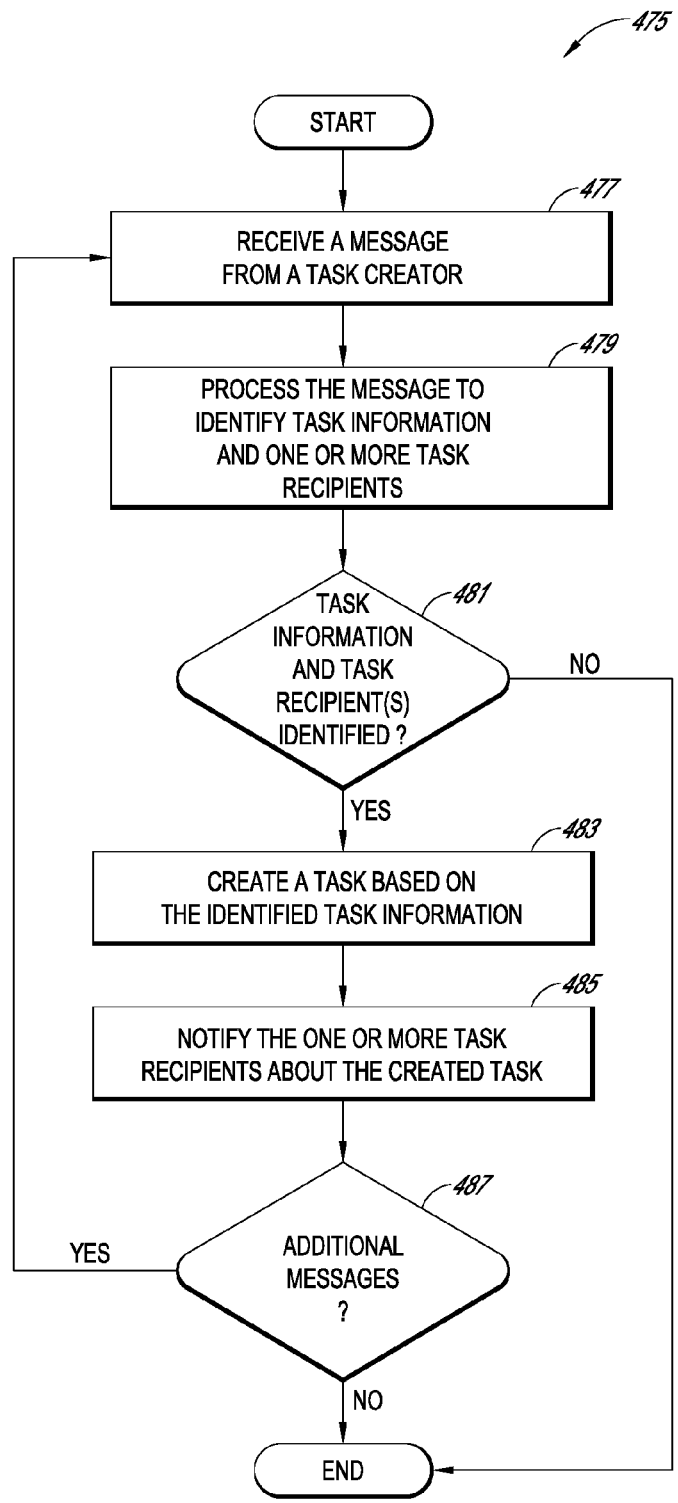
FIG. 4 is a flowchart of a method of creating and sharing tasks across one or more networks, in accordance with one embodiment.

FIG. 4 is a flowchart of a method 475 for creating and sharing tasks across one or more networks, in accordance with one embodiment. It will be understood that not all of the illustrated steps are required, and that this method can be modified without departing from the spirit and scope of the invention. Further, while various steps may be illustrated or described in a particular order, it should be appreciated that, unless otherwise noted, the steps may be performed in any suitable order.

The illustrated method 400 is depicted from the point of view of a server, such as a server hosting the task management system 315 of FIG. 3, and can be performed at least in part by the task management module 327, the communications module 353, and/or the user management module 359. The method 400 starts at a block 477, in which the task management system 315 receives a message from a task creator. As explained above with respect to FIGS. 2A-2C and 3, the task management system 315 can receive a task creation packet that includes task content data and various fields for enabling processing of the message. In some embodiments, the task creation packet can be implemented in an e-mail message sent by the task creator to the server and to one or more task recipients. In other embodiments, the task creation packet can be implemented in an SMS message, a voice communication, or a video communication.

The method 400 then moves to a block 479 to process the message to identify task information and one or more task recipients. For example, the server can process task content data that includes information about the task, such as task objectives and goals. In some arrangements, the processed task information can include a schedule of assignments for the task to ensure that the task proceeds according to the desired timeline. The server can also identify the task creator and the one or more task recipients. As explained herein, when sent in an e-mail message, the task creator may be processed in information in a "From" field of the e-mail message, while the task recipients may be processed in information in a "To," "CC," or "BCC" field of the e-mail message. Further, the server can identify a unique task identifier in the "Subject" and/or message fields of the e-mail. The server's address may also be listed in the "To," "CC," or "BCC" fields of the message.

The method 400 then proceeds to a decision block 481 to determine whether task information and task recipient(s) information is identified. If the answer to the decision block 481 is no, then the method 400 ends. However, if the answer to the decision block 481 is yes, then the method proceeds to a block 483, in which a task is created based on the identified task information. The server can therefore store the task content data, the task participant information, and any other data associated with the task.

The method 400 then moves to a block 485 to notify the one or more task recipients about the created task. For example, the server can send a notification e-mail to the task recipients. In turn, the task recipients can send a response e-mail either confirming acceptance or rejection of the task assignments. In some arrangements, the server can notify the task creator about whether or not the task recipients accept or reject the assigned task.

The method 400 then proceeds to a decision block 487 to determine whether additional messages are received. If additional messages are received, then the method 400 moves back to the block 477 to receive the message from a task creator. If no additional messages are received, then the method 400 ends.

In various other related methods, a task comment can be received from a first task participant. The task comment can be published for other task participants to review. For example, a forum or electronic message can be displayed on a web page to share messages among the task participants.

User Interface

Figure 5:
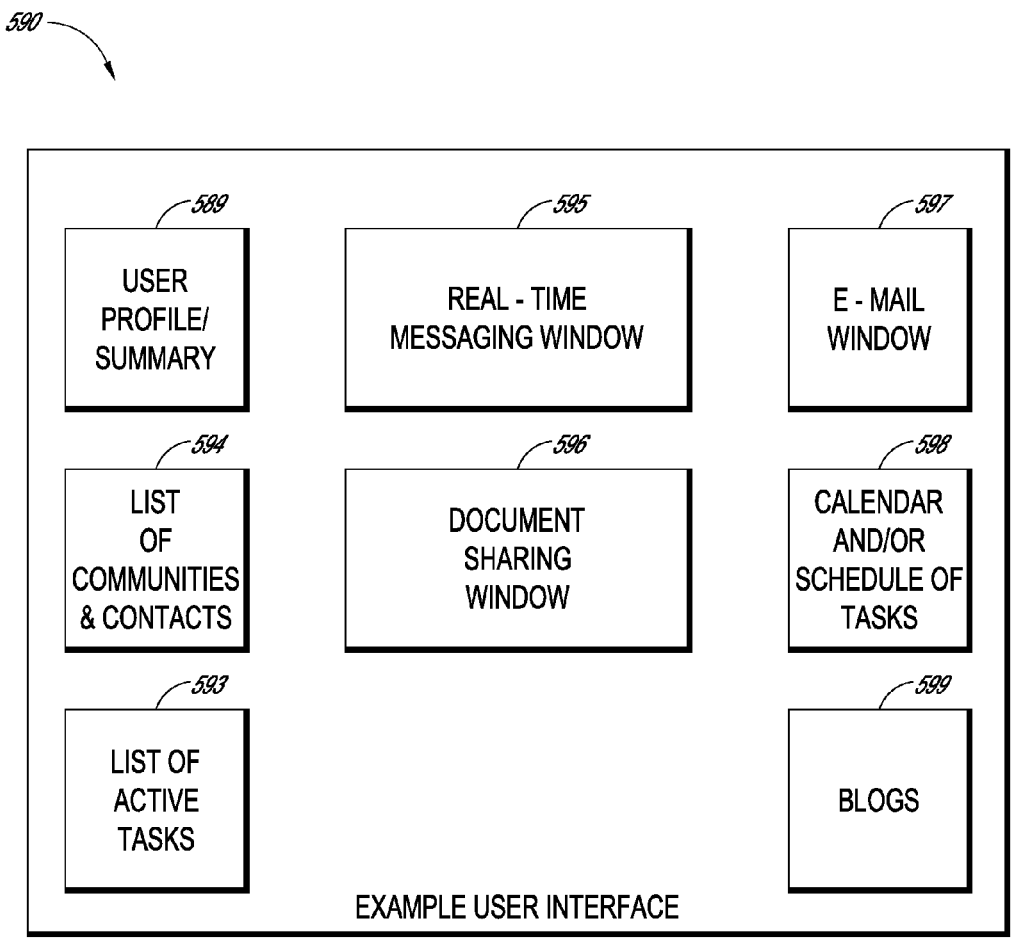
FIG. 5 is a schematic block diagram of a user interface, in accordance with one embodiment.

Turning to FIG. 5, an example user interface 590 for task management is illustrated. The user interface 590 can be displayed, e.g., on a website or other type of electronic interface. The user interface 590 can include multiple windows configured to display information and to receive inputs from the user(s) by way of various input devices. For example, the user interface 590 can include a user profile or summary box 589. The user profile box 589 can display identifying information about the user, including the user's name or username. In some instances, the user profile box 589 can display an image of the user and various other details or biographical information about the user.

The user interface 590 can also include a list 591 of user communities and/or contacts. The list 591 can include a list of the contacts with whom the user has participated in various tasks. In various implementations, for example, users may use the list 591 of user communities and/or contacts to identify and communicate with users on their list 591 of communities and/or contacts. Further, a list 593 of active tasks may also be displayed on the user interface 590. The user may select a particular task to manipulate task content data and/or to interface with participants in the particular task. For example, the list 593 of active tasks may be used to select a particular task that a user would like work on at that moment.

In addition, the user interface 590 can include a real-time messaging window 595 that can provide for real-time communications among task participants. For example, the messaging window 595 can include a real-time messaging window for the exchange of electronic text messages. Alternatively, the messaging window 595 can include a video and/or audio interface to provide for the real-time video and/or audio communication among task participants. The user interface 590 may also include a document sharing window 596 that displays a list of documents that are relevant to a particular task. As explained above, text or word processing documents, videos, audio files, presentation files, spreadsheets, and any other suitable data may be shared by way of the document sharing window 596. For example, users can see if and when other users edited or reviewed a particular file.

Furthermore, an e-mail window 597 can be displayed on the user interface 590. The e-mail window can display e-mail messages received by the user on a portion of the interface 590. In some arrangements, the user can send and receive e-mails by way of the e-mail window 597 built into the user interface 590.

Moreover, a calendar 598 and/or a schedule of tasks can be presented in the user interface 590. The calendar 598 can list the portions of a task that are assigned to the user and can enforce accountability for timely performance of the task. In some embodiments, the user can check off assignments that have been completed and may prioritize the remaining assignments. In some arrangements, other users can view the user's calendar 598, and/or notifications may be sent to all task participants when the user completes an assignment. In some embodiments, blogs 599 or other types of electronic forums may be displayed on the user interface 590. Blogs or other news streams can provide a centralized source of news or opinion relating to the task. Skilled artisans will appreciate that other windows may be presented on the user interface 590. Further examples of a user interface are discussed herein with respect to a user inbox-outbox interface, such as the interface disclosed in FIG. 12.

Multi-Layered Network Infrastructure

In various embodiments, a multi-layered network infrastructure may be employed to organize the interconnections among tasks, task participants, and documents associated with the tasks and task participants. The multi-layered infrastructure can facilitate interactions among tasks and users within a department or group (e.g., networks), and can further organize departments and groups within larger companies, organizations, or affiliates (e.g., clouds). The multi-layered infrastructure can organize the companies, organizations, and affiliates into a cloud of interconnected entities belonging to a particular geopolitical zone. In some embodiments, multiple clouds of interconnected entities can be organized into a "federation" of clouds. The federation of associated clouds can allow entities within a particular cloud to be connected with entities in another cloud. In various embodiments, the federation of clouds can facilitate communications between clouds based on previously determined access controls that regulate the interactions between and among entities belonging to different clouds.

Figure 6:
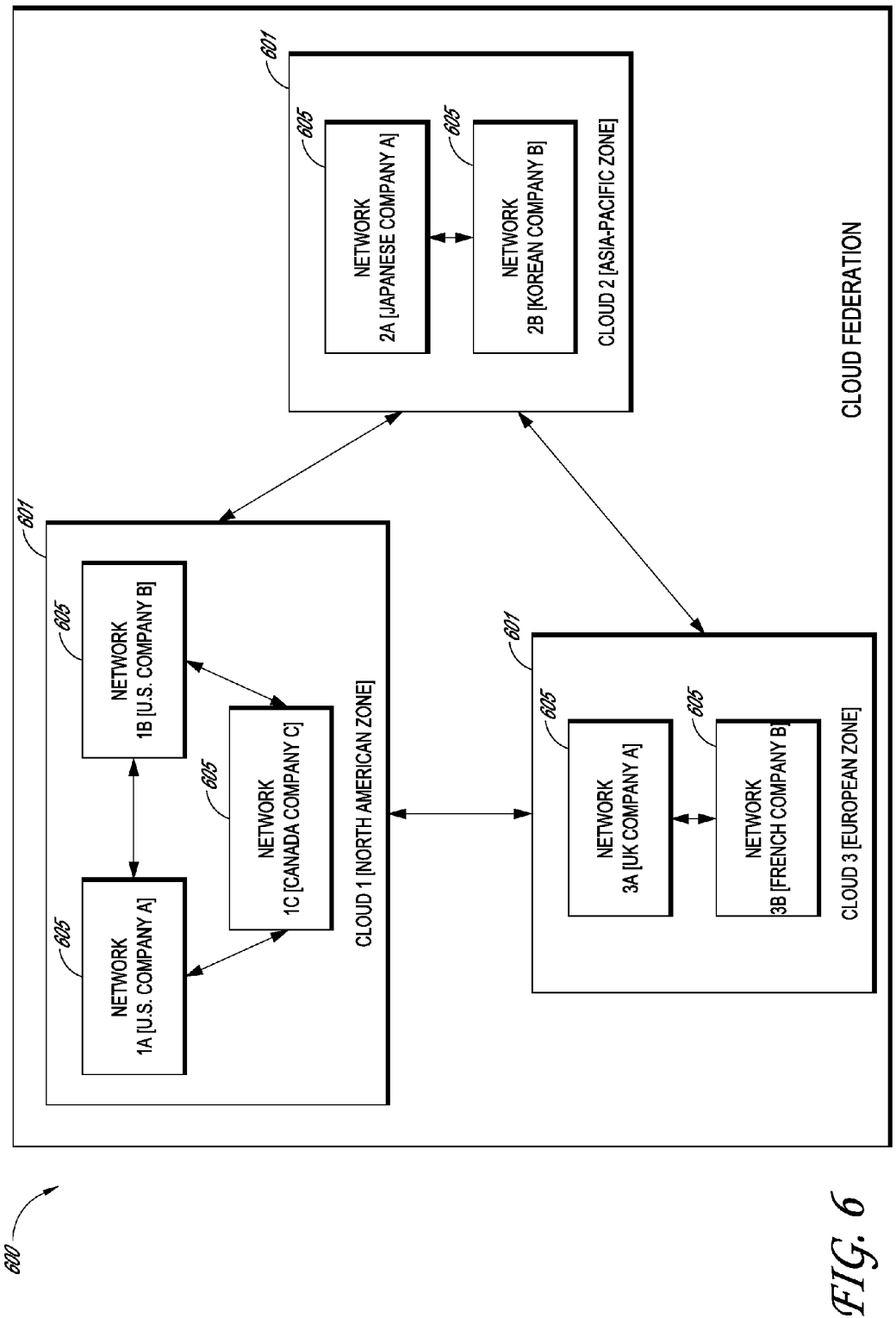
FIG. 6 is a schematic block diagram of a cloud federation including a plurality of clouds and networks.

For example, FIG. 6 is a schematic block diagram of a cloud federation 600 including a plurality of clouds 601 and networks 605. As shown in FIG. 6, various embodiments disclosed herein can include a multi-layered network architecture capable of supporting multiple layers of clouds 601, networks 605 and interactions among system users. As shown in FIG. 6, the cloud federation 600 can include Cloud 1, Cloud 2, and Cloud 3. Although only three clouds are shown in FIG. 6, it should be appreciated that any suitable number of clouds 601 may be interconnected by the federation 600. In various embodiments, each cloud 601 can represent numerous interconnected networks 605 within a geopolitical zone. For example, each cloud 601 can provide network communication between and among numerous entities, such as companies, groups of associated companies, organizations, etc. In one embodiment, a particular cloud 601 may include entities associated with a particular country, geographic association, company, organization, or a collection of organizations and companies. For example, Cloud 1 can provide network communication between and among networks 605 that are located in a particular region, such as the North American Zone, while Cloud 2 can provide network communication between and among networks 605 that are located in another region, such as the Asia-Pacific Zone. Cloud 3 may provide network communication between and among networks 605 that are located or associated with a geographic or political entity, such as the European Zone.

The cloud federation 600 can manage communications between and among Clouds 1-3 based on various security and access controls established by each cloud 601. For example, the governments or managers of Cloud 1 may require particular security controls that restrict how its users interact with users of other clouds 601. For example, Cloud 1 may only allow users to collaborate on tasks and projects with users within Cloud 1 (e.g., users within North America), or Cloud 3 may restrict collaboration to users that have various types of security or anti-virus software installed. The cloud federation 600 can facilitate communications between entities in different clouds (e.g., users in Clouds 1 and 2) that meet the access requirements or permissions of the participating clouds. In other arrangements, certain entities may require that their data be hosted by a particular local service provider. For example, the countries associated with Cloud 2 may require that all entities within or associated with that countries in the Asia-Pacific Zone participate in tasks over a local host provider. Thus, security concerns may be addressed by managing the security controls associated with a particular cloud 601.

In general, as disclosed herein, a first layer can include individual networks 605, which may correspond to an internal company network associated with a division or organization of the company, or even the entire company itself. The employees within the company, and tasks performed by employees within the company, may be organized into one or more user groups associated or affiliated with the company or organization by the multi-layered network management module 372 of FIG. 3. A second network layer may include a cloud 601 which interconnects multiple networks 605 that are associated with a particular geopolitical region or nation. For example, each cloud 601 can interconnect multiple networks 605 together, including, e.g., networks 605 that are formed within the same company and networks 605 that are formed in different companies. In various embodiments, a cloud 601 can include networks 605 that are formed by a group of affiliated or connected companies. A third network layer, e.g., the cloud federation 600, can include an overarching network architecture that interconnects multiple clouds together, e.g., clouds that interact across various geopolitical entities. The multi-layered network management module 372 shown in FIG. 3 may manage the interactions among clouds 601 and networks 605. Thus, the cloud federation 600 can provide network communication among multiple clouds that comprise multiple networks.

In some embodiments, each cloud 601 can include a plurality of networks 605. The networks 605 may correspond to, e.g., a company or a division within a company, such as an engineering division of a company. As explained above, the clouds 601 may organize networks 605 within a particular geopolitical zone. As shown in, e.g., FIG. 1, each network 605 can provide network communication among and between multiple users, which in the case of the task management system may correspond to task participants. Multiple networks 605 may be interconnected within a cloud 601. For example, in Cloud 1 shown in FIG. 6, Networks 1A, 1B, and 1C may communicate with one another within the cloud 601, i.e., Cloud 1 which spans the North American Zone. Cloud 1 may include Network 1A, which can correspond to U.S. Company A. Cloud 1 can also include Network 1B, which can be U.S. Company B, and Network 1C, which can correspond to Canadian Company C.

A second cloud 601, Cloud 2, can include two additional networks 605 associated with companies or organizations within the Asia-Pacific Zone. For example, Cloud 2 can include Networks 2A and 2B, which can correspond to Japanese Company A and Korean Company B, respectively. The users within Network 2A, for example, may interact with one another over the network 605 labeled Network 2A. At the second network layer, however, users may communicate across Cloud 2, e.g., between Networks 2A and 2B. For example, employees of Japanese Company A may collaborate with employees of Korean Company B on various projects. Further, the cloud federation 600, e.g., the third network layer, enables users within Cloud 2 to communicate with the users in Cloud 1 in order to exploit the contacts and expertise of the users in both clouds 601. For example, the cloud federation 600 may enable Japanese Company A of Network 2A to collaborate with its American division, U.S. Company A of Network 1A. Similarly, Cloud 3 can include networks 605 related to different companies or organizations within the European Zone, including, e.g., Network 3A related to United Kingdom Company A and Network 3B related to French Company B. In various arrangements, therefore, a cloud 601 can connect affiliated or associated companies within a geopolitical zone. The companies within Cloud 3 may communicate with each other through networking architecture programmed into Cloud 3; however, these companies may also be in network communication with the entities and companies of Clouds 1 and 2 as well by way of the third layer, e.g., the cloud federation 600. The cloud federation 600 can thereby provide network communication within or across multiple clouds 601 corresponding to multiple geopolitical zones, by way of, e.g., the multi-layered network management module 372 of FIG. 3.

Figure 7:
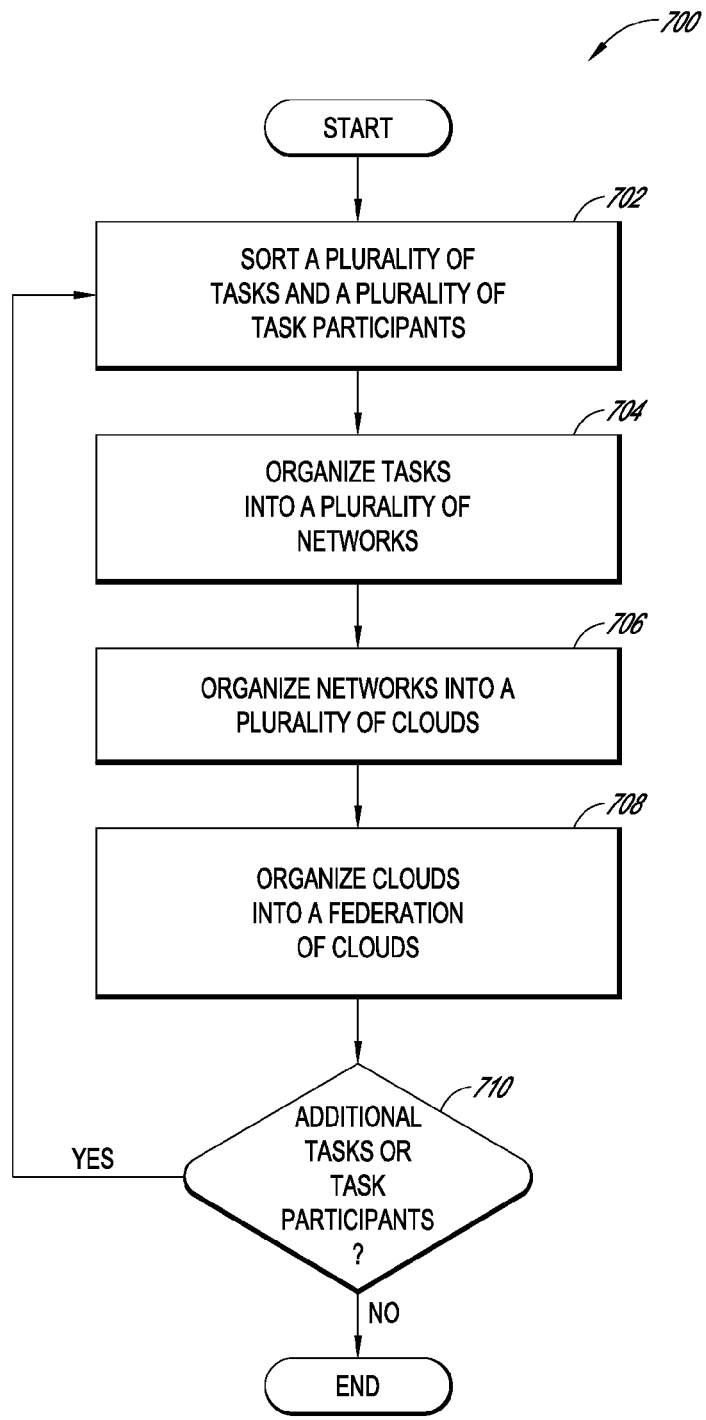
FIG. 7 is a flowchart illustrating a method for managing one or more networks.

FIG. 7 is a flowchart illustrating a method 700 for managing one or more networks. As shown in FIG. 7, the method 700 can begin in a block 702 to sort a plurality of tasks and a plurality of task participants associated with the plurality of tasks. For example, the multi-layered network management module 372 can receive and process multiple tasks that are assigned to multiple users. The method 700 can then proceed to a block 704 to organize the plurality of tasks and/or task participants into a plurality of networks based at least in part on an affiliation of each task participant with one or more users or user groups. For example, each task can be associated with a particular network (including the global network 100) by way of a network ID associated with the network in which the task is created, hosted, monitored, and/or performed. Further, as explained above with respect to FIG. 6, multiple users may be associated with a particular company or organization, or with a particular department within a larger company or organization. The multi-layered network management module 372 can recognize such affiliations and can organize users into multiple user groups based on their affiliations. Thus, members of the marketing department may be grouped into a particular network within a company, while members of the engineering department may be grouped into a different network.

The method then moves to a block 706 to organize networks into a plurality of clouds. Each cloud can represent a company or group of companies and can include a plurality of networks, as explained above with respect to FIG. 6. As explained above, each cloud can be associated with a particular geopolitical entity. For example, a particular cloud can include networks or companies associated with a particular geopolitical zone, such as a North America or Asia-Pacific Zone. The method then proceeds to a block 708 to organize the plurality of clouds into a federation of clouds, or a cloud federation. As explained above with respect to FIG. 6, users can interact within their own user group, e.g., within a department of a company. Users can also communicate within a company, e.g., within a network, or across multiple countries, e.g., within a cloud. The multi-layered network management module 372 can also enable users to communicate across multiple clouds, e.g., with users of other geopolitical zones. As explained with respect to FIG. 6, the multi-layered network management module 372 can also establish security and access controls to regulate communications across clouds. In a decision block 710, if there are additional tasks or task participants, then the method can return to the block 702 to sort additional tasks and task participants. If there are no additional tasks or participants, then the method 700 can end.

Furthermore, the multi-layered network management module 372 can be configured to track tasks that are associated with two or more networks or two or more clouds, and can organize tasks into one or more task groups based at least in part on the association of the tasks with the two or more networks or the two or more clouds. The system can also organize documents based at least in part on the association of the tasks with the two or more networks or the two or more clouds. The multi-layered network management module 372 can thereby organize multiple tasks and task participants, and their associated documents, across and within multiple clouds and networks.

Task Analytics

In various embodiments, users create tasks by sending an e-mail message to the server and to the other task participants. The use of e-mail can be particularly advantageous in some circumstances because many or most users are familiar with e-mail and its capabilities. Further, e-mail already has a built-in contact list of users that are connected to one another. Harnessing the power and ubiquity of e-mail to create and manage tasks can advantageously allow for the disclosed embodiments to rapidly spawn user contacts across multiple networks and to monitor interconnections among users at a company- or organizational level. For example, a particular user can create tasks using e-mail by sending an e-mail message to anyone with a standard e-mail address. In turn, this initial recipient can create tasks with anyone on their list of e-mail contacts, and the network of task participants can increase accordingly. By allowing for the easy creation and management of tasks based on a standard e-mail platform, the number of users interacting with the server and participating in tasks can be increased substantially.

Furthermore, the ubiquity of e-mail communications can allow users to collaborate with other users in different organizations or companies on a variety of different projects and tasks. In various embodiments, the systems disclosed herein can map the interconnections of each user based on the user's contacts, interactions with other companies, projects, topics, and documents. In some embodiments, by leveraging the ubiquity of e-mail, the system can recognize users in a particular user group (e.g., a company, organization, or a department within a company) based on their company or organization e-mail address. For example, some users may be recognized as belonging to the group "engineers" while others are recognized as belonging to the group "human resources". Users may also be recognized as belonging to a particular company, such as Company A or Company B, which may be user groups.

Companies or organizations that participate in the disclosed systems may take advantage of rich information associated with the tasks performed by users of the company or organization. For example, the task analytics module 374 and/or the user management module 359 of FIG. 3 may be programmed to analyze the tasks in which employees of a particular company participate. The task analytics module 374 can determine the users with which each employee has collaborated, including users associated with other companies or organizations. In various embodiments, the task analytics module 374 can organize tasks into one or more projects for tasks that are related. For example, a building construction project would typically include numerous related tasks, such as preparing engineering drawings, buying materials, dividing the labor, etc. In some embodiments, each project can be analyzed to determine the companies with which a particular company is collaborating. The determined collaborations can be used to identify potentially valuable business partners for the future. The task analytics module 374 can also sort documents associated with the tasks and can identify which companies or organizations have worked on or viewed each document. Thus, in some embodiments, the task analytics module 374 can manage the sharing of documents to track who uses a particular document at what time. While various activities are described as being performed by, e.g., the task analytics module 374, in some arrangements, the same activities may also be performed by the user management module 359. Skilled artisans will appreciate that various other arrangements may be possible without departing from the spirit of the disclosed embodiments.

Figure 8A:
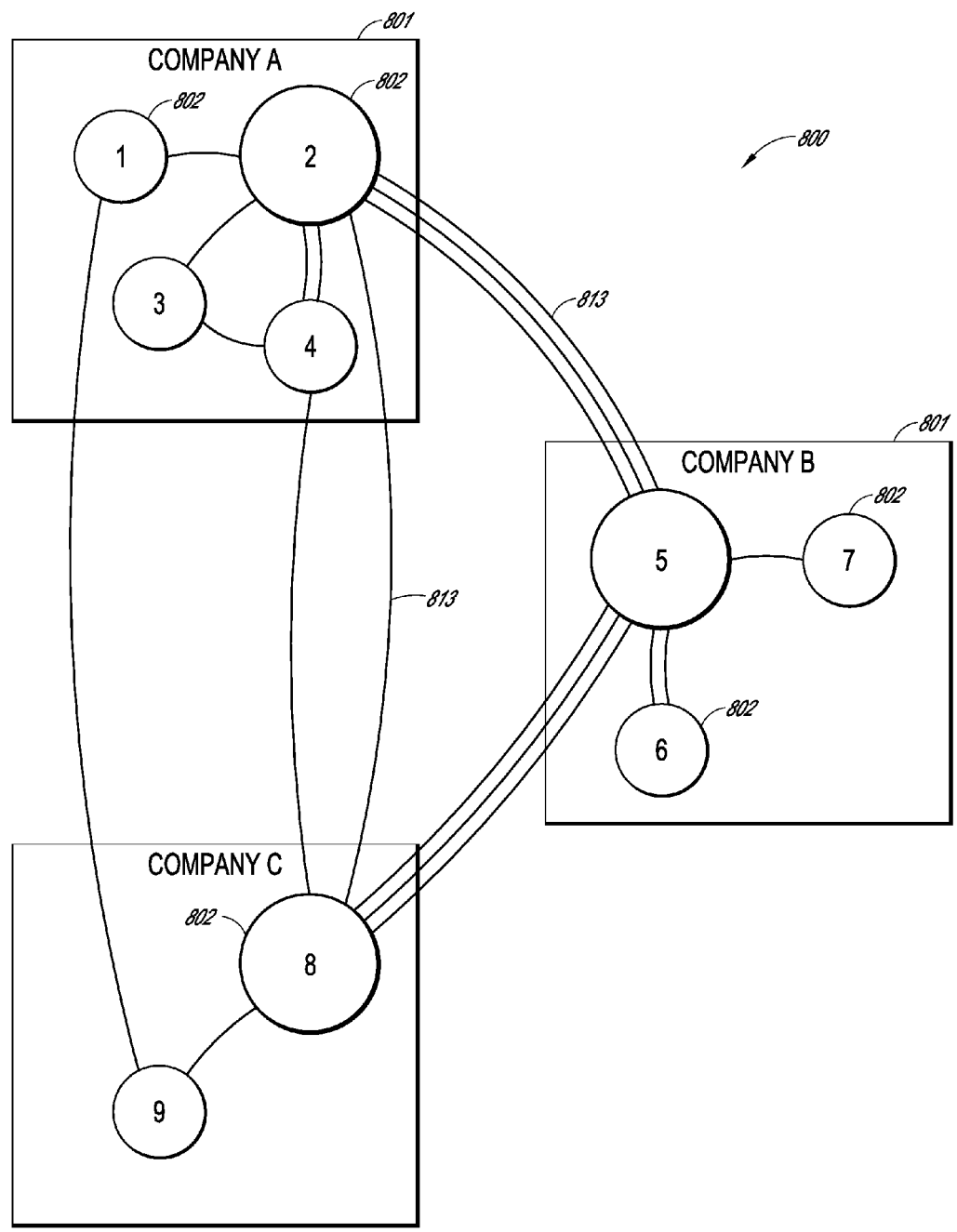
FIG. 8A is a schematic diagram of a task participant relationship map that maps relationships between users based on tasks in which each user has participated.

FIG. 8A is a schematic diagram of a task participant relationship map 800 that maps relationships between users 802 based on tasks in which each user 802 has participated. For example, in some aspects, the task participant relationship map 800 may provide a company with a snapshot of the active relationships between its employees and other system users. As shown in FIG. 8A, the users 802 may be grouped into a particular user group 801. In various embodiments, a particular user group 801 may include a company or a department within a company. In FIG. 8A, three user groups 801 are shown—Company A, Company B, and Company C. Company A includes four users 802, labeled User 1, User 2, User 3, and User 4. Company B includes three users 802 labeled User 5, User 6, and User 7. Company C includes two users 802 labeled User 8 and User 9.

In some embodiments, the task analytics module 374 can generate the map 800 of task participant relationships by identifying, for each task participant or user, other users that have participated in one or more tasks with the task participant. Thus, in FIG. 8A, task relationship lines 813 may connect two users 802 that have, or are currently participating in, a task together. For example, a task relationship line 813 connects User 1 with User 2, which may represent that Users 1 and 2 have participated or are participating in one or more projects or tasks together. As illustrated in FIG. 8A, users 802 that participate in numerous tasks on the system may be shown in larger circles, such as, e.g., User 2, User 5, and User 8. Users 802 that participate in fewer tasks may be shown in smaller circles, such as User 1 and User 7. Furthermore, if two users 802 frequently participate in tasks together, multiple task relationship lines 813 may connect the two users 802. For example, User 2 and User 5 may be known to collaborate more frequently on tasks, while User 1 and User 9 may be known to collaborate less frequently on tasks.

Companies and organizations can advantageously use the generated map 800 to monitor various relationships of interest. For example, if User 1 of Company A wants to contact User 8 of Company C regarding a potential collaboration, User 1 may not initially be connected to User 8 because they have not yet participated in any tasks together. However, the task analytics module 374 can monitor the relationships of the generated map 800 and can determine that User 2 of Company A has participated in, or is participating in, one or more tasks with User 8. The task analytics module 374 can then inform User 1 that User 2 may have a relationship with User 8, and User 2 can introduce User 8 to User 1 in order to facilitate a potential future collaboration. Alternatively, the task analytics module 374 may recognize that User 9 is within the same company (Company C) as User 8 and can inform User 1 that User 9 may have a relationship with User 8. Because User 1 already has a relationship with User 9 based on prior or current task participation, User 1 may try to contact User 8 through User 9's internal company networks.

In various embodiments, a company can monitor which other companies or organizations it frequently interacts with, e.g., which companies its employees collaborate with frequently on tasks. For example, the task analytics module 374 may determine that Company B has strong interactions with Company A and Company B based on User 5's frequent task collaborations with User 2 of Company A and User 8 of Company C. The task analytics module 374 may therefore inform a system administrator that Company B has ties with Companies A and B that the system administrator may not have previously realized. The task analytics module 374 may also sort the task participant relationships based on how active the relationships are. For example, if two users have recently participated in tasks together, the task analytics module 374 may assign a high score to the relationship, whereas, if two users participated in tasks long ago, the task analytics module 374 may assign a lower score to the relationship. In addition, the task analytics module 374 can analyze the frequency that users interact with one another on various tasks. In some embodiments, the task analytics module 374 can assign higher values or priorities to relationships that involve frequent interactions, and lower values or priorities on relationships that involve less frequent or one-time-only transactions.

Figure 8B:
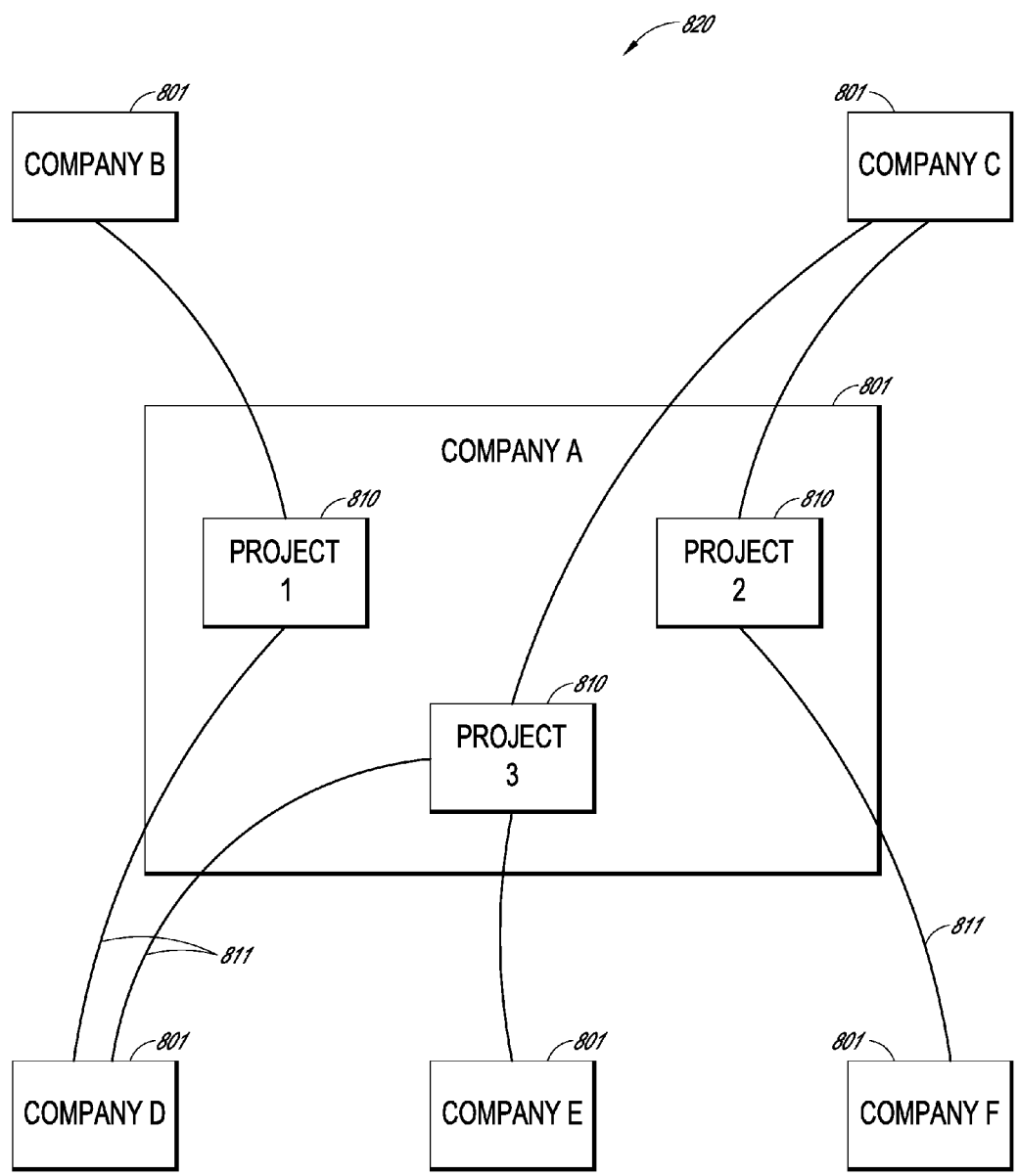
FIG. 8B is a schematic diagram of a project relationship map that identifies the user groups that are associated with various projects.

FIG. 8B illustrates a project relationship map 820 that identifies the user groups or companies that are associated with various projects. As with FIG. 8A, multiple user groups 801 are shown, including Company A, Company B, Company C, Company D, Company E, and Company F. As one example of the map 820, Company A may be working on three projects 810—Project 1, Project 2, and Project 3. The task analytics module 374 may be programmed to sort the projects 810 and identify the other companies that are currently collaborating on tasks with employees or users of Company A. Project relationship lines 811 may show relationships between two companies based on current collaborations for various projects. For example, as shown in FIG. 8B, Company B and Company D are collaborating on (or include employees that are collaborating on) Project 1. The employees of Company C and Company F may be collaborating on Project 2, while the employees of Company C, Company D, and Company E may be collaborating on Project 3.

The task analytics module 374 can sort the project relationships to identify other companies with which a particular company has frequent or recent collaborations. For example, user groups 801 that are involved in frequent or recent collaborations may be assigned a high score, while user groups 801 that are involved in less frequent or less recent collaborations may be assigned a lower score. In various embodiments, the task analytics module 374 may also monitor the documents that are shared or used by different user groups 801. For example, the task analytics module 374 may monitor the documents edited or viewed by Company A that are shared with other companies, such as Company B. The task analytics module 374 may thereby also monitor the content that is shared across different user groups 801. It should be appreciated that, while FIGS. 8A-8B illustrate particular examples of maps, the system need not actually draw or render the maps. Rather, the relationships may be stored in appropriate databases in the task management system. Skilled artisans will appreciate that there are various ways to organize and store the relationships explained herein with respect to FIGS. 8A and 8B.

Figure 9:
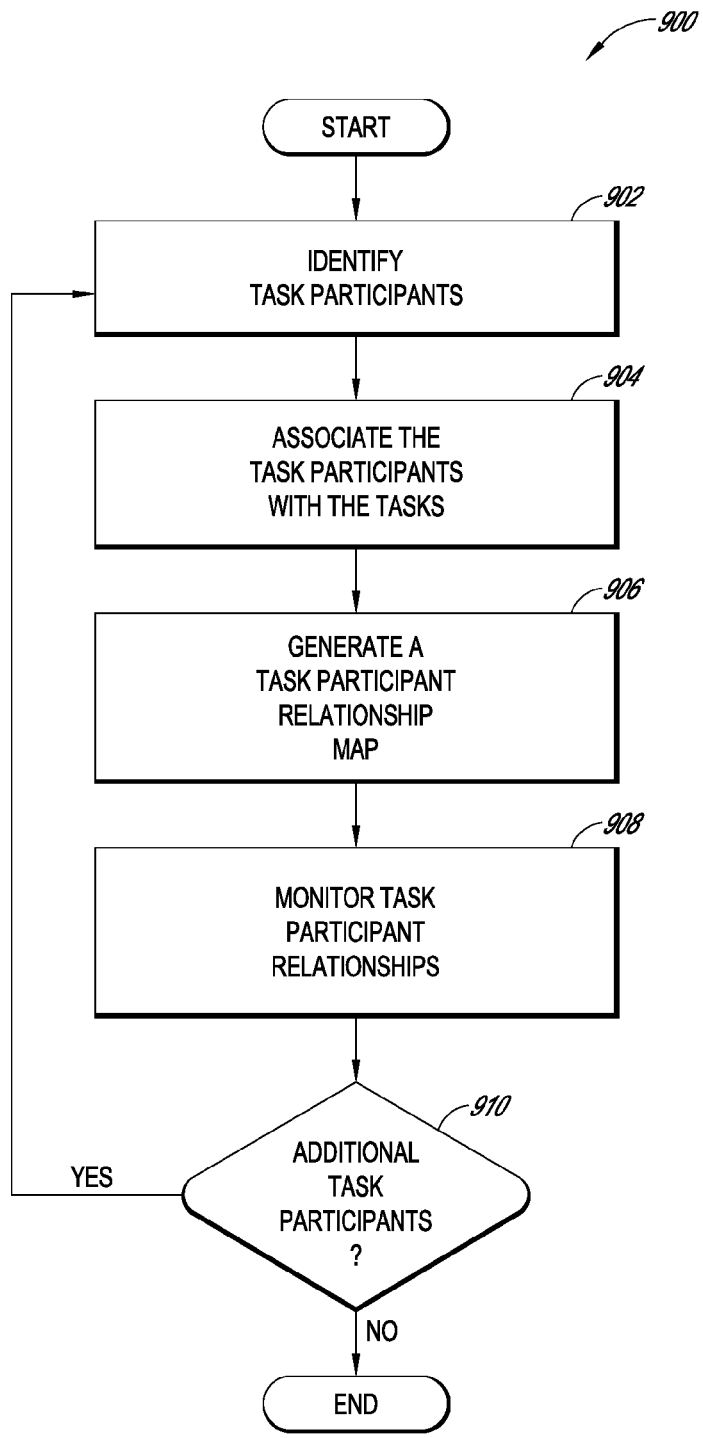
FIG. 9 is a flowchart illustrating a method for monitoring relationships between a plurality of task participants associated with a plurality of tasks.

FIG. 9 is a flowchart illustrating a method 900 for monitoring relationships between a plurality of task participants associated with a plurality of tasks. The method 900 begins in a block 902 to identify a plurality of task participants. The task participants may be identified according to their e-mail address, as explained above with respect to FIGS. 2A-2C. As explained herein, the task participant may be a system user that participates in a task. For example, a task participant may be a task creator or a task recipient.

The method 900 then moves to a block 904, wherein the task participants are associated with the plurality of tasks. As explained above with respect to the user management module 359 of FIG. 3, each user may be associated with a list of active tasks. In various embodiments, a history of past tasks may be provided for each user. The method 900 then moves to a block 906 to generate a task participant relationship map. As explained above with respect to FIG. 8A, the task analytics module 374 can identify, for each task participant, other task participants that have participated in one or more tasks with the task participant. By identifying relationships between task participants, a company can better understand its reach, e.g., the network of contacts with which employees of the company have collaborated. In a block 908, the task participant relationships may be monitored. For example, the task analytics module 374 can determine which companies a particular organization collaborates with frequently and/or recently. The method 900 then moves to a decision block 910. If a decision is made that there are additional task participants to be processed, then the method moves to the block 902 to identify the additional task participants. Otherwise, the method 900 ends.

Figure 10A:
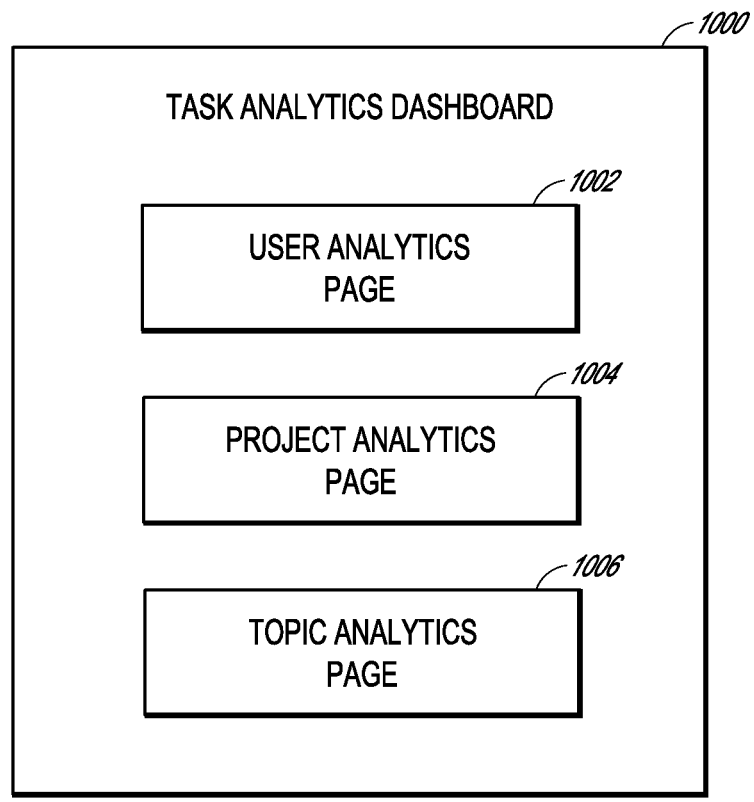
FIGS. 10A-10D are schematic diagrams illustrating various components of a task analytics dashboard, in accordance with various embodiments.

Turning to FIG. 10A, in some embodiments, the task analytics module 374 can present a task analytics dashboard 1000 (e.g., a user interface) to a system user, such as a company manager or executive. The dashboard can organize, analyze, and clearly present the information that the task analytics module 374 and/or the user management module 359 aggregate regarding the tasks performed by employees or users associated with the particular company or organization. In various embodiments, the user interface module 341 can be programmed to render and/or present the various pages to a user. As explained herein, the task analytics module 374 and the user management module 359 can aggregate large volumes of data about tasks that are performed over time by employees of a particular company, users of an organization, etc. The dashboard 1000 can thereby give managers and executives a high-level view of the company's reach by user, project, and topic. In particular, as shown in FIG. 10A, the dashboard can present different page views to a decision-maker. For example, the dashboard 1000 can include a user analytics page 1002, a project analytics page 1004, and a topic analytics page 1006. The three page views shown in the dashboard 1000 of FIG. 10A are only illustrative, however; other views are possible.

Managers and executives can utilize the rich information gleaned from tasks performed by users within a company to make important business decisions. In some embodiments, the dashboard 1000 can help managers and executives in making internal decisions based on each employee's or division's productivity, on-time percentage, or other measure of performance. For example, the dashboard 1000 can enable managers and executives to utilize data aggregated by the task analytics module 374 and/or the user management module 359 when making decisions regarding which employees to promote or to put in charge of a particular new project. In addition to assisting with internal decisions, in various embodiments, the dashboard 1000 can help managers and executives in making high-level decisions about company or organizational strategy in relation to other competitors or business partners. For example, the dashboard 1000 can assist decision-makers in analyzing which business partnerships are valuable and fresh for the company. The dashboard can also utilize the known task relationships between company employees and other users of a different company to recognize the reach of a company's relationships. If, for example, Company A is developing a new product that requires a novel material set, decision-makers can analyze employee task relationships to determine if any employees are connected to other users at a materials development company.

Figure 10B:
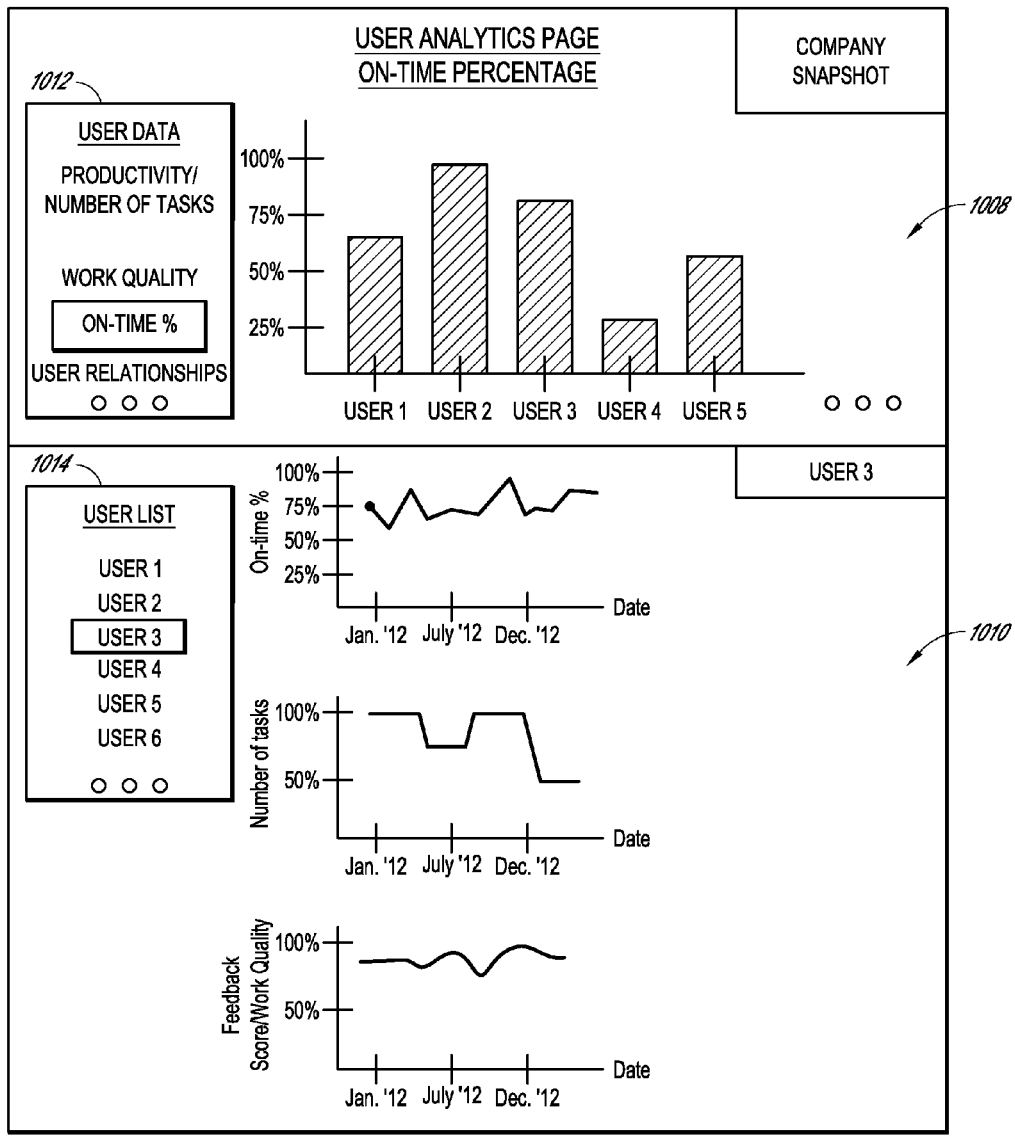

For example, as shown in FIG. 10B, the dashboard can include the user analytics page 1002 that illustrates organization- or company-wide information about the tasks performed by each user/employee. For example, the user analytics page 1002 can include a company snapshot view 1008 that graphically illustrates a particular data set for every employee in the company. In some embodiments, a user data box 1012 can list various data sets that may be relevant to a decision-maker. For example, as shown in the data box 1012 of FIG. 10B, a decision-maker can select user productivity/number of tasks, work quality (e.g., based off peer, client, or supervisor feedback, etc.), on-time task completion percentage, user relationships (e.g., based on the task participant relationship map 800), and any other suitable data set. In the company snapshot view 1008 of FIG. 10B, the task on-time percentage data set has been selected, and a graph is presented to the user or decision-maker that illustrates the percentage that each user (e.g., employee) of the company completes an assigned task on time. Skilled artisans will understand that other data sets are possible.

Furthermore, the user analytics page 1002 can include a user snapshot view 1010. The user snapshot view 1010 can include a user list box 1014 that lists every user or employee within the company or organization. Alternatively, a search box can be provided to allow the decision-maker to search for a particular employee or user. When a particular user is selected, such as User 3 in the example of FIG. 10B, various graphs, charts, or tables may be presented to the decision-maker. For example, as shown in the user snapshot view 1010, the task on-time percentage, user productivity (e.g., by number of tasks), and feedback score/work quality are presented for User 3. Thus, a decision-maker can utilize the user analytics page 1002 to analyze data concerning each user, or employee, of the company or organization. It should be appreciated that the user analytics page 1002 may include more or fewer windows or boxes than shown in FIG. 10B.

Figure 10C:
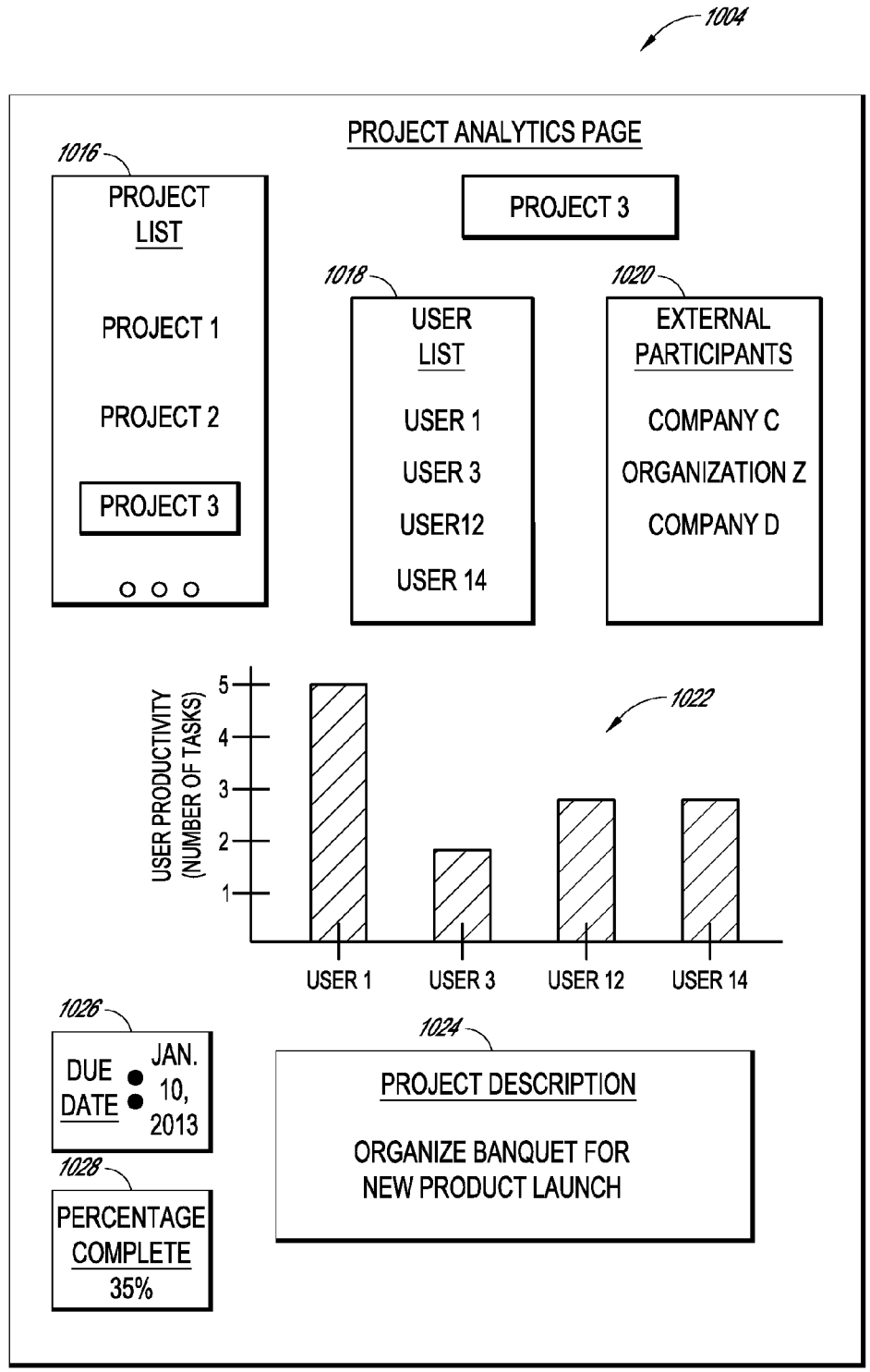

Turning to FIG. 10C, the project analytics page 1004 is illustrated. In the illustrated example, the project analytics page 1004 is shown for the projects conducted by a particular user group, which in the case of FIG. 10C can be Company A. As explained herein, a particular project may include one or more related tasks, such as a project directed to organizing a banquet for a new product launch. The project analytics page 1004 can present project data to a decision-maker. For example, the project analytics page 1004 can include a project list box 1016 that lists the current, ongoing projects in which the company or organization is involved. Alternatively, a search box can be provided to allow the decision-maker to search for a particular project. A decision-maker, such as a manager or executive, can select a project from the project list box 1016. In FIG. 10C, for example, Project 4 is selected. The project analytics page 1004 can include a user list box 1018 showing all the users within the company or organization that are participating in Project 4. Furthermore, a user productivity view 1022 can illustrate a chart or table showing the productivity of each user involved in Project 4. For example, in FIG. 10C, the user productivity view 1022 illustrates the number of tasks assigned to each user involved in Project 4. In addition, as explained herein with respect to the project relationship map 820 of FIG. 8B, the project analytics page 1004 can include an external participants list box 1020 that lists the task participants that are not members or employees of the company. For example, as shown in the list box 1020 in FIG. 10C, Company C, Organization Z, and Company D may also be participating in Project 4. Decision-makers can use the data presented in the external participants list box 1020 to analyze external relationships associated with a project or with groups of projects.

Further, the project analytics page 1004 can include a project description box 1024 that lists the description or objectives of Project 4. For example, as shown in the project description box 1024, the goal of Project 4 is to organize a banquet for Company A. A due date box 1026 can list the due date for completing the project, which is Jan. 10, 2013, for Project 4. In addition, a project completion percentage box 1028 can list the completion percentage for Project 4, which is shown to be 35%. While various data sets are illustrated in the project analytics page 1004 of FIG. 10C, it should be appreciated that any other suitable data sets may be presented to a decision-maker regarding ongoing projects for a particular user group. It should be appreciated that the project analytics page 1004 may include more or fewer windows or boxes than shown in FIG. 10C.

Figure 10D:
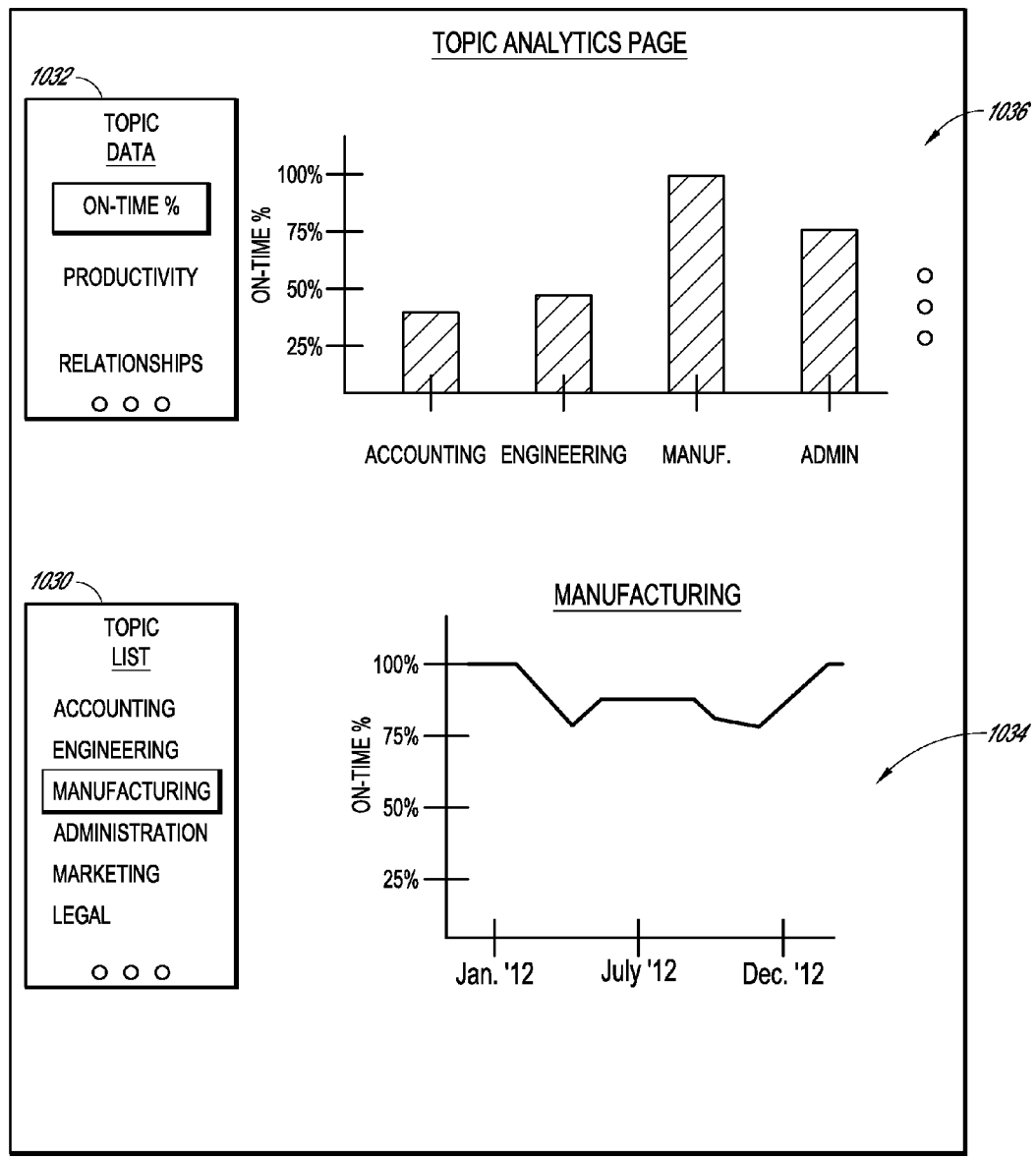

FIG. 10D is a schematic diagram of the topic analytics page 1006. In various embodiments, a particular topic can be associated with a division of a company, such as an accounting, engineering, manufacturing, or administrative division. In other aspects, a topic can refer to particular types of subject matter or documents. In some embodiments, the topic analytics page 1006 can include a company snapshot view 1036 and/or a topic snapshot view 1034. For example, in the company snapshot view 1036, a topic data box 1032 can list numerous data sets that can be selected by a decision-maker, such as a company manager or executive. Alternatively, a search box can be provided to allow the decision-maker to search for a particular topic, subject, and/or document. In FIG. 10D, the task on-time percentage is selected, and the company snapshot view 1036 can illustrate the on-time percentage for each division of a company. The decision-maker can thereby monitor the work-product of each of its divisions in order to help her make effective business decisions.

As shown in FIG. 10D, the topic snapshot view 1034 can illustrate in-depth details of the various topic data sets for each particular topic. For example, a topic list box 1030 can list the various topics, such as accounting, engineering, manufacturing, etc. In FIG. 10D, Manufacturing is selected, and one or more graphs relating to the Manufacturing topic can be presented to the decision-maker. For example, the task on-time completion percentage is shown over time for the Manufacturing division of Company A. Skilled artisans will understand that there may be various other types of topics and data sets that can be presented to a decision-maker. It should be appreciated that the topic analytics page 1006 may include more or fewer windows or boxes than shown in FIG. 10D.

Figure 11:
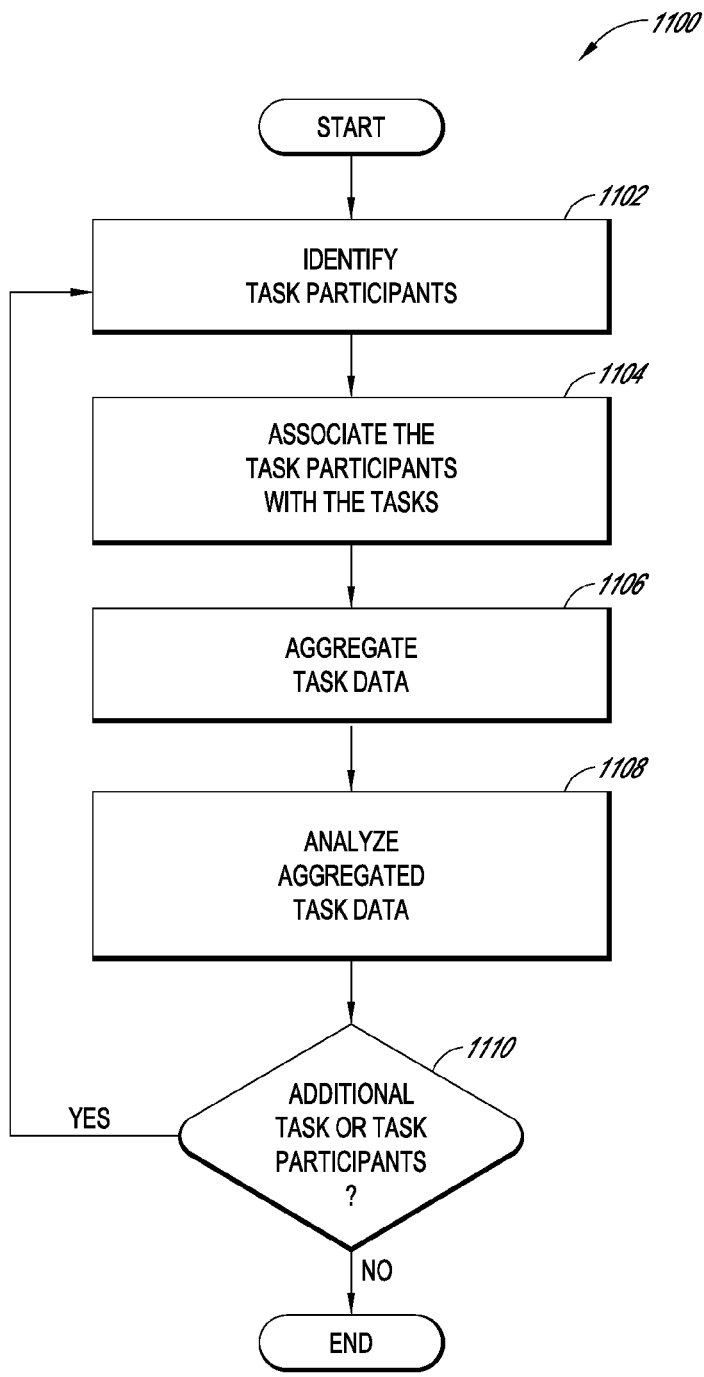
FIG. 11 is a flowchart illustrating a method for analyzing task data associated with a plurality of tasks and a plurality of task participants.

FIG. 11 is a flowchart illustrating a method 1100 for analyzing task data associated with a plurality of tasks and a plurality of task participants. The method 1100 can begin in a block 1102 to identify a plurality of task participants. As explained herein with respect to FIG. 9, for example, the task participants may be identified according to their e-mail address, as explained above with respect to FIGS. 2A-2C. The task participant may be a system user that participates in a task. For example, a task participant may be a task creator or a task recipient. The method 1100 moves to a block 1104, in which the plurality of task participants are associated with the plurality of tasks. For example, as explained above with respect to the user management module 359 of FIG. 3, each user may be associated with a list of active tasks.

The method 1100 then proceeds to a block 1106 to aggregate task data associated with the tasks and the task participants. For example, as explained herein with respect to FIGS. 8A-8B and 10A-10D, the task management system can aggregate data about each task participant within a company or organization, such as each user's productivity or timeliness. In various arrangements, data concerning user relationships can be aggregated for use by a decision-maker. Further, task data related to particular projects can be aggregated by the system. For example, information regarding a particular project's objectives and schedules can be presented on a company- or organization-wide basis. A list of internal and external users (e.g., users from other organizations and companies) can also be presented. In some embodiments, task data for various topics can also be aggregated. For example, as explained herein with respect to FIG. 10C, task data for various divisions in a company can be aggregated. Decision-makers may use the aggregated data collected about the divisions to make internal decisions and decisions relating to the company's larger strategic goals and partnerships.

The method then moves to a block 1108 to analyze the aggregated task data. For example, the task analytics module 374 and/or the user management module 359 can sort the aggregated data according to data sets selected by a decision-maker or user. For example, the system can sort user data by productivity (number of tasks), efficiency, timeliness, user relationships, etc. In various embodiments, the aggregated task data can be presented to a user in a dashboard, such as the interfaces shown in FIGS. 10A-10D. The method then moves to a decision block 1110 to determine whether there are additional tasks or task participants. If there are additional tasks or task participants, then the method 1100 returns to the block 1102 to identify the task participants. Otherwise, the method 1100 ends.

Centralized User Inbox and Outbox

FIG. 12 is a schematic diagram of a user's inbox-outbox interface 1200 (e.g., belonging to User 1 in FIG. 12), in accordance with various embodiments. In various embodiments, it can be advantageous to share tasks, messages, and documents among users of one or more networks. In particular, it can be advantageous to present persistent objects to authorized users (such as task participants), which can be viewed, edited, and presented on the inbox-outbox interface 1200 of each authorized user. In some embodiments, the object management module 346 of FIG. 3 can include instructions that store and manage the objects. The integrated interface module 348 of FIG. 3 may be programmed to share and/or present the objects to authorized users.

Example objects that are managed by the object management module 346 can include tasks, documents, messages, requests, reports, etc. For example, messages can include conversations between one or more users (e.g., a continuous chat stream between users), e-mails (which may be converted to a form suitable for display in the interface 1200 in some arrangements), alerts (e.g., a communication sharing or forwarding a document), and any other type of communication that can be shared among authorized users. In addition, tasks can include various categories or types of tasks, including actions, approvals, etc. For example, User 1 can send User 2 an action-type task to review a draft contract, and User 1 or User 2 can forward the reviewed draft contract to a supervisor as an approval-type task, in which case the supervisor would be asked to review and approve the draft contract. As another example, request-type objects may include invitations to join networks or communities and/or to join the task management system, invitations to events (such as calendar-based invitations and schedules), and requests for contact connections (e.g., requesting to be connected with another individual or organization). Furthermore, report objects can include technical-type report objects in which users can report technical problems to system administrators. Further, report objects can also include complaint-type report objects, in which users can complain to system administrators about other users or non-users that abuse or spam the system or that otherwise violate the system's terms of service.

For example, the inbox-outbox interface 1200 of FIG. 12 can include an inbox 1201 and an outbox 1203. In this example, the inbox-outbox interface 1200 is displayed for a particular authorized user, User 1. When the inbox 1201 is selected, the inbox-outbox interface 1200 can display objects (e.g., tasks, messages, documents, etc.) that are sent to User 1 and/or that are pending to be performed or edited by User 1. When the outbox 1203 is selected, the inbox-outbox interface 1200 can display objects that are sent from User 1 to another authorized user and/or that are pending to be performed or edited by another user. For example, a message sent from User 1 to User 2 would appear in User 1's outbox 1203 and User 2's inbox 1201. Similarly, a task assigned by User 1 to User 4 would appear in User 1's outbox 1203 and in User 4's inbox 1201. A document last edited by User 1 that is shared with Users 6, 7, and 8 may appear in the inbox 1201 of Users 6, 7, and 8 and in the outbox 1203 of User 1. In some arrangements, the updated document may also appear in the inbox 1201 of User 1.

The inbox-outbox interface 1200 can provide users with a high-level summary of objects in their interface 1200. For example, the inbox 1200 can show in a concise manner the overall status of the object (e.g., a pending task), the aggregate performance of the object (e.g., what percentage of an overall task has been completed by the task participants), the number of comments or messages associated with the objects, the number and/or type of documents associated with the objects (e.g., whether the documents are files, videos, photos, etc.), object due date, and object importance/urgency. It should be appreciated that other details of the objects can also be presented in the user interface.

Furthermore, the inbox-outbox interface 1200 can include a show-all button 1205 that illustrates the objects in the inbox 1201, objects in the outbox 1203, and, in various arrangements, objects in other folders. In the example implementation of FIG. 12, the show-all button 1205 is selected, such that all objects associated with User 1 are displayed in the inbox-outbox interface 1200.

In some embodiments, the object management module 346 and/or the integrated interface module 348 can include persistent containers for objects that serve to organize the objects into desired workspaces. Advantageously, the containers can organize users (e.g., people) and objects (e.g., tasks, documents, messages, etc.) according to a particular topic or grouping. The persistent containers can thereby maintain a persistent organizational structure for objects and users over time. For example, in the case of a group of users working on a particular project, the users may work on several tasks, may create and edit multiple documents, and may send and receive numerous messages over the course of the project. The object management module 346 and/or the integrated interface module 348 may be programmed to track and organize the objects worked on during the course of the project in a single container. Thus, the container can track when each task was created and by whom and can track the performance of each task over time by each task participant (including all the status updates associated with the task). The container can track the messages sent and received by users, and can track the history of edits to documents over the course of the project. Further, the container can track the actions of each user. For example, the container can track each participant's actions and can monitor when a user begins or quits working on the project, and/or when and what a user says in a message or communication. Thus, even long after a project is completed, for example, an auditor can track the entire history of the project (including the progression of objects such as tasks, documents, messages, etc.) in the persistent container that collects the objects associated with the project.

The persistent containers described herein can take any suitable form. For example, a container can include a single object, such as a single task. In such cases, the container can track all the activities (including messages, documents, users, etc.) associated with the task. At another level, the container can include a folder of multiple objects (such as a folder including multiple tasks, messages, documents, and other types of objects). The container can thus track the history of the group of objects in the folder. For example, in some embodiments, the inbox-outbox interface 1200 can include one or more folders 1207 that include objects shared between the user and a particular group of other users, or that include objects associated with a particular topic or project. For example, User 1 may include folders 1207 for each of User 1's clients and colleagues. Thus, User 1 may include a first folder for Bank A that handles User 1's accounts, a second folder for Lawyer B that handles User 1's legal work, a third folder for Partner C that is User 1's business partner, and a fourth, Personal folder that includes objects shared with family members. Thus, the task management module 327 (including, e.g., the object management module 346 and the integrated interface module 348) can include instructions to automatically route objects associated with a particular user group. For example, the object management module 346 can include instructions to route bank statements sent by Bank A to User 1 in the "Bank A" folder. Messages sent between User 1 and Lawyer B can be stored and presented in the "Lawyer B" folder. Tasks, messages, or documents shared between User 1 and Partner C may be routed to the "Partner C" folder, while objects associated with User 1's family may be routed to the "Personal" folder. Further, the folders 1207 can sort objects according to a particular topic or project, such as a folder for a project directed to designing a particular widget. In some embodiments, the persistent containers disclosed herein can include communities (e.g., groups of related folders) and networks (e.g., groups of related communities, such as divisions of a company or an association of related companies). Thus, the object management module 346 can include instructions to sort objects according to their subject matter and organize them in the user inbox-outbox interface 1200 accordingly.

In the user inbox-outbox interface 1200 of FIG. 12, all the objects associated with User 1 are displayed, as the "show-all" option 1205 is selected. In some arrangements, the inbox-outbox interface 1200 can include an object field 1209, an object type field 1211, an object content field 1213, a status field 1215, and a due date field 1217. For example, in the first line illustrated in the interface 1200 of FIG. 12, "Task 1" is the name of the object listed in the object field 1209. The object type field 1211 indicates that Task 1 is a task, and the object content field 1213 describes the task content, e.g., the task information, which for Task 1 includes meeting with Vendor to discuss their sales strategy for a particular product. The status field 1215 indicates that Task 1 has been completed by "You," e.g., by User 1. The due date field 1217 indicates that the due date is Jan. 5, 2013.

Similarly, Document 3 is the object in the object field 1209 of the second line, which has an object type 1211 of "document." The object content field 1213 indicates that the document includes a spreadsheet of User 1's accounts receivable, while the status field 1215 indicates that Document 3 is pending for User 1 to edit or revise by the due date of Feb. 1, 2013.

In the third line of the interface 1200 shown in FIG. 12, Message 2 is the object listed in the object field 1209, which has an object type 1211 of "Message." The content listed in the object content field 1213 of Message 2 is from another user, Mary, asking User 1 (John) to call Mary ASAP regarding an upcoming meeting. The status field 1215 indicates that the action item is pending for "You," e.g., User 1. The system generated a due date of Feb. 9, 2013 for replying to Mary.

On the fourth line or entry of the interface 1200, Task 4 is listed as the object in the object field 1209, which has an object type 1211 of a task. The object content field 1213 describes the task as "Complete product reliability testing." The status field 1215 indicates that Task 4 is pending for User 3. Thus, an authorized user (such as User 1 or another task participant) may have assigned Task 4 to User 3 to complete, such that the remaining task participants are waiting for User 3 to complete assigned Task 4. The inbox-outbox interface 1200 will therefore display Task 4 as pending for User 3 until User 3 completes Task 4 or otherwise assigns it to another user. The due date field 1217 indicates that Task 4 is due by Mar. 1, 2013.

The final line of the interface 1200 lists Task 5 (which has an object type field 1211 of task) in the object field 1209. For Task 5, the object content field 1213 indicates that Task 5 includes planning a seminar. In the status field 1215, Task 5 is illustrated as being assigned by User 1 to User 4 with a due date listed in the due date field 1217 of Mar. 13, 2013. If User 4 accepts the assignment of Task 5, then the user inbox-outbox interface 1200 may update to indicate that Task 5 is "pending for User 4," rather than just "Assigned by You to User 4." Further, when User 4 completes Task 5, the status field 1215 may be updated to "Completed by User 4." Although various examples have been described herein with respect to the interface 1200 of FIG. 12, it should be appreciated that any other configuration or layout of the interface 1200 may be suitable.

As described herein, the objects listed in the inbox-outbox interface 1200 may be updated in real-time and shared with other authorized users. For example, the status field 1215 may change to reflect the current status when a user takes a particular action. For example, when User 1 replies to Mary in Message 2, the status field 1215 may update to indicate that Message 2 has been "Completed by You [User 1]" and/or that Message 2 is "Pending for Mary" to respond. Further, if User 1 edits Document 3 and requests that User 6 review and revise User 1's edits, the status field 1215 may read "Completed by You [User 1]" and/or "Pending for User 6" to review and revise. Similarly, when a task has been accepted, completed, begun, etc., as explained above, the status field 1215 for Tasks 1, 2, or 5 may be appropriately updated. While the status described with reference to FIG. 12 has referred to the status as complete, pending, or assigned, it should be appreciated that any other suitable status may be tracked and updated by the system. For example, the status of the object may also be accepted, declined, draft, suspended, archived, closed, trashed, important, etc. In some embodiments, the owner of an object (e.g., a task creator or a project leader) can view the aggregate status of all the task participants. For example, the object owner can view what percent of the overall task is completed and/or what percent of task participants have completed their assigned portions of the task. When an object owner is satisfied that the object is sufficiently complete, the owner can close the object (e.g., task). Alternatively, the owner can re-assign the object or task to a task participant to re-do or improve their assigned actions. In some arrangements, an object can be archived, in which the object (e.g., a task and its associated components) can be locked for future audit purposes. The status of the object (e.g., task) can accordingly be updated and presented to authorized users.

In addition, User 1 can sort the objects listed in the interface 1200 according to various parameters. For example, User 1 can sort the objects by the status field 1215 such that objects that are pending with User 1 (e.g., those objects that are awaiting action from User 1) are listed first, whereas objects pending with other users are listed later. In the example of FIG. 12, therefore, if sorted by status field 1215, in some embodiments, Document 3 and Message 2 may be listed first since they are pending action by User 1 (e.g., "You" in FIG. 12). In some arrangements, Tasks 4 and 5 would then be listed next, since these are objects that are awaiting action by another user. Task 1 may be listed last when sorted by status field 1215 since it has already been completed.

In other arrangements, the objects listed in the interface 1200 may be sorted by due date field 1217 such that upcoming due dates appear near the top of the interface 1200 and that due dates coming later appear nearer the bottom of the interface 1200. The order listed in FIG. 12 corresponds to one example in which the objects are listed according to due date field 1217. It should be appreciated that the sorted objects, although described as appear "before" or "above" other objects may be illustrated in any suitable manner to indicate that some objects have a higher priority or urgency than other objects. In various embodiments, the task management system can automatically recognize and sort objects (e.g., tasks, etc.) according to status and/or due date. For example, the task management system 315 can recognize items that are coming due soon (e.g., due today, next week, past due, etc.) or that are otherwise urgent for a particular user and can automatically sort those items as high-priority items. Further, the task management system 315 can automatically recognize which objects are awaiting action from a user and sort those objects as high- or low-priority objects in some arrangements. In some embodiments, the system can recognize objects from a particular customer or user and can prioritize those objects as high- or low-priority objects. Further, the system can prioritize objects based on the frequency of activity for the particular objects and/or based on the topic of the particular object. Thus, the systems disclosed herein can automatically sort objects according to their urgency or priority and can present the sorted objects to authorized users in a suitable manner, such as that shown in the interface 1200.

By allowing authorized users to sort objects in the inbox-outbox interface 1200, the task management module 327 can enable users to see which items require their immediate attention and which items may be deferred to a later date. Further, the status field 1215 allows authorized users to identify which objects are awaiting actions from which users. For example, User 1 may notice that other users are waiting for him to update Document 3 and respond to Message 2. The status field 1215 and the due date field 1217 can thereby enforce real-time accountability for authorized users, such as task participants, by identifying other users that are impeding progress on a task (or other object) and by encouraging users to timely meet the specified deadlines.

Authorized users may be any system user that has permission to share objects (e.g., tasks, messages, documents, etc.) in the system. Any suitable authentication or permission mechanism may be suitable. In some embodiments, for example, the disclosed networks can include members, guests, and public categories. For example, members can be officially recognized users of the system, such as employees of a particular company or members of a particular organization or association of companies. A guest may be a system customer that is given various permissions to use the system. In some arrangements, a public category user may be a visitor to the system or a prospective future user of the system given limited permissions to use the system. Any other suitable mechanisms may be used to categorize users as authorized users. The containers or spaces disclosed above may be configured to share objects with contacts according to their permission category, allowing multiple levels of authorization and access in some arrangements.

Figure 13:
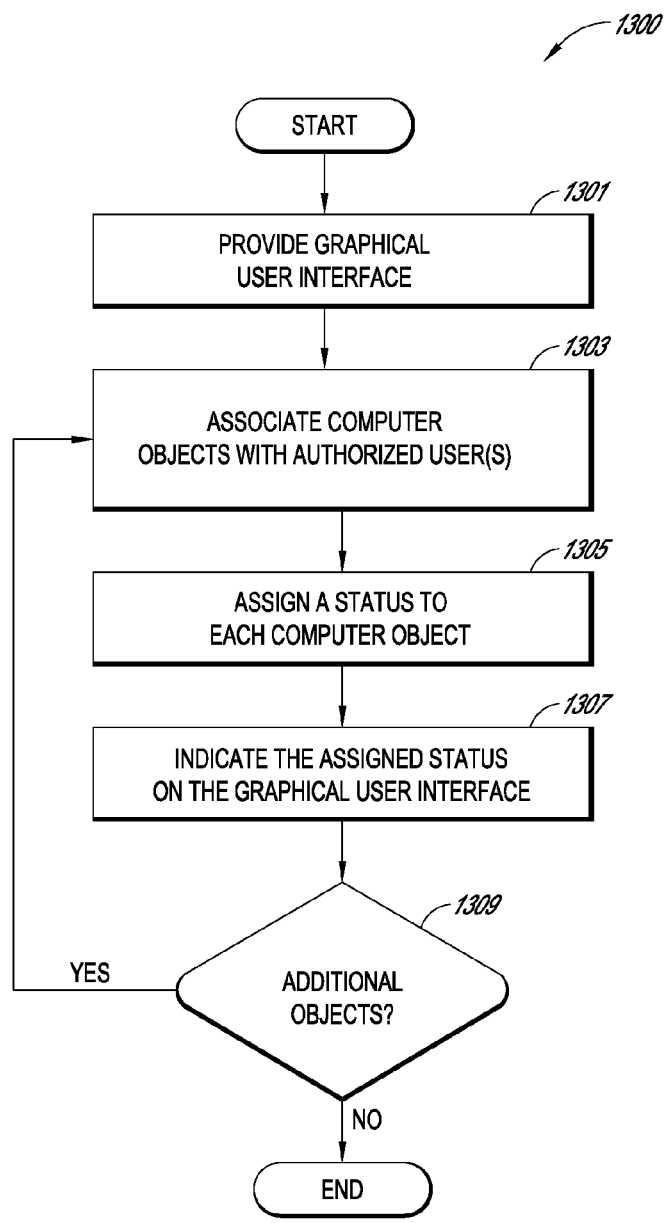
FIG. 13 is a flowchart illustrating a method for managing objects stored on one or more networks.

FIG. 13 is a flowchart illustrating a method 1300 for managing a plurality of computer objects stored on a system of one or more networks. The method 1300 begins in a block 1301 to provide a graphical user interface that lists a plurality of computer objects. In various embodiments, the integrated interface module 348 can provide the graphical user interface, however it should be appreciated that any other modules of the task management system 315 may receive the objects. Each object can include object content associated with the object. As explained herein, the objects can include a task, message, document, etc. In embodiments where the object corresponds to a task, the object content can include task information and/or a task schedule. The object content can also include information identifying the task participants and/or the task due date. In FIG. 12, for example, the inbox-outbox interface 1200 may share a list of objects with authorized users on a webpage. In some arrangements, the integrated interface module 348 and/or the object management module 346 may be implemented to share the objects with authorized users. As an example, the object listed as Task 1 may be shared between User 1 and any other task participants in Task 1. The object labeled as Document 3 may be shared between User 1 and any other users authorized to view and/or edit Document 3. Message 2 may be shared between User 1 (John in this example) and Mary, in addition to anyone else that John or Mary authorize to participate in their conversation. Task 4 may be shared between User 1, User 3, and any other users participating in Task 4 or that are otherwise authorized to view the Task 4 object. Continuing with the example of FIG. 12, Task 5 may be shared between User 1, User 4, and any other task participants or otherwise-authorized users.

The method moves to a block 1303 to associate each object with one or more authorized users. For example, a group of users working on a particular task, e.g., a group of task participants, may be associated with the task. Thus, if Users 1, 2, and 3 are collaborating on Task 1, the task management module 327 (e.g., the object management module 346) may associate Users 1, 2, and 3 with Task 1. In various arrangements, authentication procedures may be implemented by the task management module 327 (e.g., the object management module 346) and/or the user management module 359 to manage access to the object.

Turning to a block 1305, an object status is assigned to each computer object of the plurality of objects that indicates the status of that computer object within the system. In some arrangements, the object management module 346 may assign the object status to the objects. For example, the object status may indicate that the object has been assigned to a particular user to be performed, or that the object is pending action by a particular user. Further, the status may also show that the status has been completed by a particular user. For example, as explained herein with respect to FIG. 12, for a task object such as Task 1, the task object may have been completed by User 1, in which case the task status is "completed." For other task objects, such as Task 4, the task may be accepted by User 3 and awaiting further action by User 3 (e.g., "pending"). The due date field may indicate when User 3 is expected to complete the outstanding task. Further, tasks such as Task 5 may have been assigned by User 1 to User 4, but not yet accepted by User 4. In general, therefore, the status of an object can indicate what actions have already been taken and by whom, and what actions need to be taken and by whom. The object management module can be programmed to update each computer object and/or object status in response to an action taken by an authorized user.

The method then moves to a block 1307 to indicate the assigned status on the graphical user interface to each of the authorized users associated with the computer object. In various arrangements, the integrated interface module 348 can include instructions to indicate the status of each object in real-time to authorized users. As explained herein with respect to FIG. 12, for example, the inbox-outbox interface 1200 can include an entry that shows whether a computer object is assigned, pending, completed, etc. Further, the inbox-outbox interface 1200 can indicate which user took a particular action at a particular date and/or time. By indicating the status of the computer objects on the graphical user interface, users may be held accountable for their assigned duties and timelines.

The method then moves to a decision block 1309 to determine if there are additional objects. If a decision is made that there are additional objects, then the method 1300 moves to the block 1303 to associate the objects with the one or more authorized users. If a decision is made that there are no additional objects, then the method 1300 ends.

All of the features described above may be embodied in, and automated by, software modules executed processors or integrated circuits of general purpose computers. The software modules may be stored in any type of computer storage device or medium. All combinations of the various embodiments and features described herein fall within the scope of the present invention.

Although the various inventive features and services have been described in terms of certain preferred embodiments, other embodiments that are apparent to those of ordinary skill in the art, including embodiments which do not provide all of the benefits and features set forth herein and do not address all of the problems set forth herein, are also within the scope of this invention. The scope of the present invention is defined only by reference to the appended claims.

What is claimed is:

1. A computer-implemented method for managing tasks in a server, comprising:
  receiving an e-mail message sent from a first user to an e-mail address assigned to the server, the e-mail message comprising task information related to a new task;
  processing the e-mail message to create the new task and identify the task information to be shared by a plurality of users in a computer memory;
  inviting one or more users to share the new task;
  receiving an acceptance of the new task from the one or more users;
  associating the one or more users that accepted the new task with the task information;
  assigning a status to the new task based on the stage of completion of the new task by the one or more associated users; and
  organizing the new task and a plurality of other tasks into a network of tasks based at least in part on a network identifier associated with the new task.

2. The method of claim 1, further comprising providing a graphical user interface that lists the new task and the status to a user.

3. The method of claim 2, wherein assigning the status to the new task comprises detecting a change in status of the task, and updating the graphical user interface to indicate to all the associated users that the status of the task has changed.

4. The method of claim 1, wherein inviting one or more users to share the new task comprises sending an electronic message to the one or more users.

5. The method of claim 1, wherein the e-mail message is sent to a plurality of users who are all associated with the task.

6. The method of claim 5, wherein the system receiving the e-mail message updates stored task information with recipient information specific to the recipient of the electronic message.

7. The method of claim 1, wherein processing the e-mail message comprises analyzing text in a subject line of the e-mail message or in a message field of the e-mail message.

8. The method of claim 1, further comprising generating a task schedule based at least in part on the task information.

9. The method of claim 1, further comprising aggregating task data from the network of tasks.

10. The method of claim 9, wherein aggregating task data comprises aggregating and sorting data corresponding to at least one of task participant productivity, task participant work quality, task participant on-time percentage, and task participant relationship data.

11. The method of claim 9, wherein aggregating task data comprises generating a graphical map of task participant relationships.

12. The method of claim 11, wherein the graphical map is generated by identifying, for each task participant, other task participants that have participated in one or more tasks with the task participant.

13. The method of claim 12, further comprising organizing the plurality of task participants into a plurality of user groups and monitoring the relationships of the task participants in different user groups.

14. The method of claim 10, wherein aggregating task data comprises sorting a plurality of projects and monitoring the productivity of each task participant associated with a particular project.

15. The method of claim 1, wherein organizing the new task and a plurality of other tasks into a network of tasks further comprises organizing a plurality of task networks into at least one cloud of networks.

16. The method of claim 15, further comprising organizing a plurality of clouds of networks into a cloud federation of networks based at least in part on interactions among the plurality of clouds.

17. A system having one or more processors and configured for managing tasks, the system comprising:
 a task management module configured to run on the one or more processors and programmed to:
  receive an e-mail message sent from a first user to an e-mail address assigned to the system, the e-mail message comprising task information related to a new task;
  process the e-mail message to create the new task and identify the task information to be shared by a plurality of users;
  invite one or more users to share the new task;
  receive an acceptance of the new task from the one or more users;
  associate the one or more users that accepted the new task with the task information; and
  assign a status to the new task based on the stage of completion of the new task by the one or more associated users; and
 a multi-layered network management module configured to run on the one or more processors and programmed to organize the new task and a plurality of other tasks into a network of tasks based at least in part on a network identifier associated with the new task.

18. The system of claim 17, further comprising an integrated interface module configured to run on the one or more processors and programmed to provide a graphical user interface that lists the new task and status to a user.

19. The system of claim 18, wherein the integrated interface module is further programmed to detect a change in status of the task, and to update the graphical user interface to indicate to all the assigned users that the status of the task has changed.

20. The system of claim 17, wherein the e-mail message was sent to a plurality of users who are all associated with the task.

21. The system of claim 17, wherein the task management module is programmed to generate a task schedule based at least in part on the task information.

22. The system of claim 17, the system further comprising a task analytics module configured to run on the one or more processors and programmed to aggregate task data from the network of tasks.

23. The system of claim 22, wherein the task analytics module is programmed to aggregate and sort data corresponding to at least one of task participant productivity, task participant work quality, task participant on-time percentage, and task participant relationship data.

24. The system of claim 22, wherein the task analytics module is programmed to generate a graphical map of task participant relationships.

25. The system of claim 24, wherein the graphical map is generated by identifying, for each task participant, other task participants that have participated in one or more tasks with the task participant.

26. The system of claim 23, wherein the task analytics module is programmed to aggregate task data by sorting a plurality of projects and monitoring the productivity of each task participant associated with a particular project.

27. The system of claim 17, wherein the multi-layered network management module is programmed to organize a plurality of task networks into at least one cloud of networks.

28. The system of claim 27, wherein the multi-layered network management module is further programmed to organize a plurality of clouds of networks into a cloud federation of networks based at least in part on interactions among the plurality of clouds.

29. A non-transitory computer-readable medium having stored thereon code that when executed by a processor performs a method comprising:
 receiving an e-mail message sent from a first user to an e-mail address assigned to a server, the e-mail message comprising task information related to a new task;
 processing the e-mail message to create the new task and identify the task information to be shared by a plurality of users;
 inviting one or more users to share the new task;
 receiving an acceptance of the new task from the one or more users;
 associating the one or more users that accepted the new task with the task information;
 assigning a status to the new task based on the stage of completion of the new task by the one or more associated users; and
 organizing the new task and a plurality of other tasks into a network of tasks based at least in part on a network identifier associated with the new task.

30. The computer-readable medium of claim 29, wherein the method comprises providing a graphical user interface that lists the new task and status to a user.

* * * * *